US012645221B2

(12) United States Patent
Yoon et al.

(10) Patent No.: US 12,645,221 B2
(45) Date of Patent: Jun. 2, 2026

(54) METHOD AND SYSTEM FOR REMOTELY CONTROLLING ROBOTS, AND BUILDING HAVING TRAVELING ROBOTS FLEXIBLY RESPONDING TO OBSTACLES

(71) Applicant: NAVER LABS CORPORATION, Seongnam-si (KR)

(72) Inventors: Young Hwan Yoon, Seongnam-si (KR); Kay Park, Seongnam-si (KR); Jin Young Choi, Seongnam-si (KR); Jung Eun Kim, Seongnam-si (KR); Seul Bin Hwang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 126 days.

(21) Appl. No.: 18/469,269

(22) Filed: Sep. 18, 2023

(65) Prior Publication Data

US 2024/0004399 A1     Jan. 4, 2024

Related U.S. Application Data

(63) Continuation of application No. PCT/KR2022/000122, filed on Jan. 5, 2022.

(30) Foreign Application Priority Data

Mar. 19, 2021   (KR) ........................ 10-2021-0036135
Jun. 23, 2021   (KR) ........................ 10-2021-0081913

(51) Int. Cl.
    *G05D 1/00*          (2024.01)

(52) U.S. Cl.
    CPC .................................. *G05D 1/0238* (2013.01)

(58) Field of Classification Search
    CPC .............. G05D 1/0238; G05D 1/0287; G05D 2105/285; G05D 2107/60; G05D 1/2247;
    (Continued)

(56) References Cited

U.S. PATENT DOCUMENTS 9,689,696 B1 *   6/2017   Russell ................ G05D 1/0287
9,821,455 B1 *   11/2017   Bareddy ................ G06Q 10/06
    (Continued)

FOREIGN PATENT DOCUMENTS

JP        10312216 A      11/1998
JP      2018101191 A       6/2018
    (Continued)

OTHER PUBLICATIONS

ISR issued in PCT/KR2022/000122, mailed Apr. 12, 2022.
Notice of allowance issued in Korean patent application No. 10-2021-0081913, dated Dec. 9, 2022.

*Primary Examiner* — Abby Lin
*Assistant Examiner* — K. R. D
(74) *Attorney, Agent, or Firm* — Greer Burns & Crain Ltd.

(57)     ABSTRACT

The present invention relates to remotely controlling robots and provides a method and a system, for remotely controlling robots, that are capable of controlling moving paths of a plurality of robots. The method for remotely controlling traveling robots comprises the steps of: controlling a specific robot to move along a preset first path; receiving an obstacle event for a specific area of the first path; generating a second path avoiding the specific area on the basis of the obstacle event; and controlling the specific robot so that same moves along the second path, wherein the destination of the second path is related to the destination of the first path.

20 Claims, 18 Drawing Sheets

(58) Field of Classification Search

CPC ........... G05D 2109/10; G05D 2111/10; G05D 1/229; G05D 1/249; G05D 1/622; G05D 1/6987; G05D 1/0246; G05D 3/00; G05D 1/225; G05D 1/0027; G05D 2107/70; G05D 1/0291; G05D 1/639; G05D 1/0088; G05D 1/0214; B25J 5/00; B25J 9/16; B25J 19/02; B25J 9/1664; B25J 5/007; B25J 19/023; B25J 9/1661; B25J 9/1666; B25J 11/008; B25J 9/1679; B25J 9/1689; G05B 19/4061; G05B 19/41895; G05B 2219/40476; G05B 2219/40477; G05B 2219/31006; G05B 2219/31003; G05B 2219/50393; G05B 19/41865; G05B 2219/31005; G05B 2219/39091; B65G 1/1373; B65G 1/0492; G06Q 10/08; Y10S 901/01

See application file for complete search history.

(56) References Cited

U.S. PATENT DOCUMENTS

| | | | | |
|---|---|---|---|---|
| 10,467,891 | B1 * | 11/2019 | Bart | G08B 25/008 |
| 2004/0246144 | A1 * | 12/2004 | Siegel | G08G 1/0965 340/902 |

| | | | | |
|---|---|---|---|---|
| 2009/0015404 | A1 * | 1/2009 | Lin | B25J 9/1682 340/540 |
| 2009/0030605 | A1 * | 1/2009 | Breed | B60W 30/18154 340/901 |
| 2017/0355081 | A1 * | 12/2017 | Fisher | G05D 1/0246 |
| 2017/0361462 | A1 * | 12/2017 | Chelian | B25J 9/1697 |
| 2018/0173238 | A1 * | 6/2018 | Tsubota | G05D 1/0214 |
| 2018/0211103 | A1 * | 7/2018 | Sohn | G06V 40/23 |
| 2018/0299882 | A1 * | 10/2018 | Kichkaylo | G05B 19/41895 |
| 2018/0356241 | A1 * | 12/2018 | Correnti | H04L 67/12 |
| 2019/0176328 | A1 * | 6/2019 | Kichkaylo | G05D 1/0231 |
| 2020/0009734 | A1 * | 1/2020 | Kim | B25J 9/1697 |
| 2020/0175863 | A1 * | 6/2020 | Sakurada | G08G 1/0141 |

FOREIGN PATENT DOCUMENTS

| | | | |
|---|---|---|---|
| JP | 2021043520 | A | 3/2021 |
| KR | 1020120090387 | A | 8/2012 |
| KR | 1020180038669 | A | 4/2018 |
| KR | 1020190134554 | A | 12/2019 |
| KR | 102148010 | B1 | 8/2020 |
| KR | 1020200144363 | A | 12/2020 |
| WO | 0223297 | A1 | 3/2002 |

* cited by examiner

CURRENT POSITION : AREA A ON FLOOR 3 ( 3, 1, 1 )

1st Floor

2nd Floor

RECEIVE OBSTACLE EVENT FROM
SPECIFIC ROBOT TO BE CONTROLLED                 S110

GENERATE MODIFIED MOVING PATH
CONSIDERING OBSTACLE EVENT AND
TRANSMIT GENERATED PATH TO SPECIFIC ROBOT       S120

SEARCH FOR AT LEAST ONE ROBOT
TO BE CONTROLLED THAT IS MOVING THROUGH AREA     S130
INCLUDING OBSTACLE EVENT

TRANSMIT MODIFIED MOVING PATH
TO RETRIEVED ROBOT                               S140

(a)

730a (b)

730b (c)

730

N4

N5

M1

(a)

730c (b)

730d

730

(c)

N4

N5

M1

METHOD AND SYSTEM FOR REMOTELY CONTROLLING ROBOTS, AND BUILDING HAVING TRAVELING ROBOTS FLEXIBLY RESPONDING TO OBSTACLES

CROSS-REFERENCE TO RELATED APPLICATIONS

This is a continuation application of International Application No. PCT/KR2022/000122, filed Jan. 5, 2022, which claims the benefit of Korean Patent Application Nos. 10-2021-0036135 filed Mar. 19, 2021 and 10-2021-0081913 filed Jun. 23, 2021.

BACKGROUND OF THE INVENTION

Field of Invention

The present invention relates to remotely controlling robots, and more particularly, to a method and a system for remotely controlling robots that are capable of controlling the moving path of a robot in consideration of obstacles.

Description of Related Art

With the advancement of technology, various service devices are emerging, particularly in recent times, there has been active development of technology for robots that perform various tasks or services.

Further, recently, with the development of artificial intelligence technology, cloud technology, etc., the utilization of robots is gradually increasing.

Meanwhile, in order to provide various tasks or services with a robot, it is very important to set a moving path to accurately move the robot to a target point.

Meanwhile, when the robot travels in a space, obstacles and the like may exist on the moving path. When it is impossible to travel along a planned path due to obstacles, the moving path and traveling plan should be changed according to a detour path.

Accordingly, Korean Patent No. 10-2148010 (system and method for providing unmanned vehicle IoT service based on cloud server) discloses a method of generating a detour path in units of robots.

However, when the detour path is generated in units of robots, it is only possible to generate a detour path after a different robot passing through the same path has also encountered obstacles, which may cause robots to move to inefficient paths. Therefore, there is still a need for a control system that is capable of efficiently controlling the moving path of a plurality of robots even when there are environmental changes due to obstacles on the moving path of the robots.

BRIEF SUMMARY OF THE INVENTION

The present invention is directed to providing a method and a system for remotely controlling robots. More specifically, the present invention is directed to providing a method and a system for remotely controlling robots that are capable of efficiently controlling the moving paths of a plurality of robots.

Further, the present invention is directed to providing a method and a system for remotely controlling robots in which, when an obstacle event occurs in which a specific robot is unable to move along a designated traveling path due to obstacles or the like while traveling, information on such obstacles or the like can be reflected in moving paths of different robots.

In addition, the present invention is directed to providing a method and a system for remotely controlling robots, which provide a user environment that enables efficient control of the moving paths of the robots.

To achieve the above-mentioned objects, there is provided a method of remotely controlling robots, the method includes: performing control of a specific robot to move along a first path that is preset; receiving an obstacle event for a specific area of the first path, generating a second path for avoiding the specific area based on the obstacle event; and performing control of the specific robot to allow the specific robot to move along the second path, wherein a destination of the second path is related to a destination of the first path.

In addition, there is provided a system for remotely controlling traveling of robots, the system includes: a communication unit configured to transmit and receive data to and from a robot; and a control unit configured to perform control of a specific robot to move along a first path that is preset, in which the control unit, in case of receiving an obstacle event for a specific area of the first path, generates a second path avoiding the specific area based on the obstacle event, and performs control of the specific robot to allow the specific robot to move along the second path, and in which a destination of the second path is related to a destination of the first path.

There is provided a non-transitory computer-readable recording medium storing a program for remotely controlling robots. The program, when executed by a processor, causes the processor to perform the step including performing control of a specific robot to move along a first path that is preset; receiving an obstacle event for a specific area of the first path; generating a second path avoiding the specific area based on the obstacle event; and performing control of the specific robot to allow the specific robot to move along the second path, in which a destination of the second path may be related to a destination of the first path.

There is provided a building in which a robot that flexibly cope with obstacles travels. According to the present invention, the building includes: an indoor area in which the robot travels; and cameras disposed in the building and configured to photograph the indoor area, through which the robot is controlled to travel based on control commands received from a cloud server. In the case where the robot is traveling along a first path that is preset, and an obstacle event occurs for a specific area included in the first path in the indoor area, the cloud server generates a second path that avoids the specific area using image information taken through the camera, and performs control of the robot to allow the robot to travel along the second path.

In one example, a destination of the second path is related to a destination of the first path.

In one example, the second path is a path in which at least a portion of the first path is modified such that the specific area is excluded from the first path.

In one example, the cloud server determines whether an avoidance path exists that avoids the specific area and reaches the destination of the first path, generates the second path in the case where the avoidance path exists as a result of the determination, and performs a different control related to a mission assigned to the robot, according to a mission characteristic of the mission assigned to the robot, in the case, where the avoidance path does not exist, as a result of the determination.

In one example, the different control includes: a first control configured to assign the mission assigned to the robot to a different robot in the case where the mission assigned to the robot has a characteristic of a first mission that is transferable to the different robot from the robot; and a second control configured to move the robot to the specific area in the case where the mission assigned to the robot has a characteristic of a second mission that is not transferable to a robot different from the robot.

In one example, in the case where the mission assigned to the robot is a mission to transport an object that the robot has received, the mission assigned to the robot corresponds to the characteristic of the second mission that it is not transferable to a different robot.

In one example, in the case where there is a different robot having a moving path that includes the specific area related to the obstacle event among a plurality of robots that travel through the indoor area, a control related to the specific area is performed for the different robot.

In one example, in the case where the degree of urgency of a mission assigned to a different robot is determined by the cloud server, and the degree of urgency of the mission assigned to the different robot is such that it is possible to pass through the specific area, as a result of the determination, the moving path of the different robot is controlled, by the cloud server, such that monitoring of whether the obstacle event has been resolved is performed by the different robot, and in the case where the degree of urgency of the mission assigned to the different robot is such that it is impossible to pass through the specific area, as a result of the determination, a new moving path is generated by modifying the moving path of the different robot, by the cloud server, so that the specific area is excluded from the moving path of the different robot.

In one example, a type of the obstacle event is specified by the cloud server using image information taken through the camera, and a resolution expected time of the obstacle event is specified based on the type of the obstacle event, and a moving path including the area in which the obstacle event occurred is transmitted to at least one robot by the cloud server to allow the at least one robot to move to the specific area in which the obstacle event occurred after the resolution expected time of the obstacle event.

As described above, a method and a system for remotely controlling robots according to the present invention provides a robot control environment that can flexibly respond to obstacles by reflecting information on obstacles affecting movement of the robot to a corresponding robot as well as to moving paths of different robots.

Further, a method and a system for remotely controlling robots according to the present invention use robots to monitor whether an obstacle event has been resolved, thereby enabling efficient remote management of obstacles without an administrator's intervention.

In addition, a method and a system for remotely controlling robots according to the present invention continuously monitor whether an obstacle event is released (or resolved) so that, when the obstacle event is released, the corresponding area can be used as a traveling path for a robot. Therefore, in the present invention, the traveling of a plurality of robots can be efficiently controlled according to situations of obstacles in a space.

Furthermore, in the present invention, when a detour path of a robot cannot be generated due to obstacles, it is possible to allow a mission assigned to the robot to be completed even in an unexpected situation due to obstacles by using a different robot or allowing the intervention of an administrator.

BRIEF DESCRIPTION OF THE DRAWINGS

FIGS. 1 and 2 are conceptual views for describing a method and a system for remotely controlling robots according to the present invention.

FIG. 3 is a conceptual view for describing a method of estimating the current position of a robot and an image collected from the robot, in the method and a system for remotely controlling robots according to the present invention.

BRIEF DESCRIPTION OF THE DRAWINGS

Figure 2:
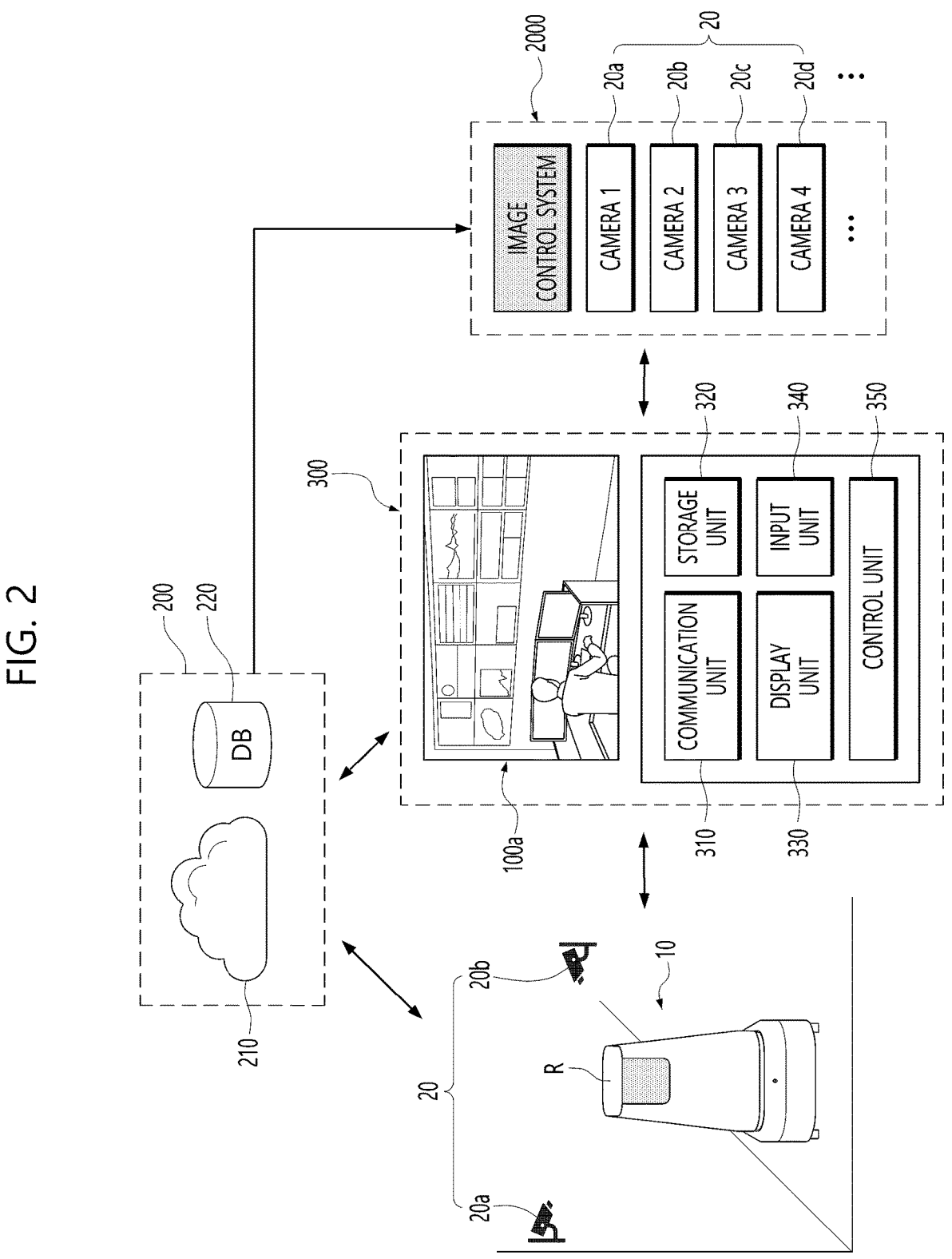

Hereinafter, exemplary embodiments disclosed in the present specification will be described in detail with reference to the accompanying drawings. The same or similar constituent elements are assigned with the same reference numerals regardless of reference numerals, and the repetitive description thereof will be omitted. The terms 'module', 'unit', 'part', and 'portion' used to describe constituent elements in the following description are used together or interchangeably in order to facilitate the description, but the terms themselves do not have distinguishable meanings or functions. In addition, in the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 1:
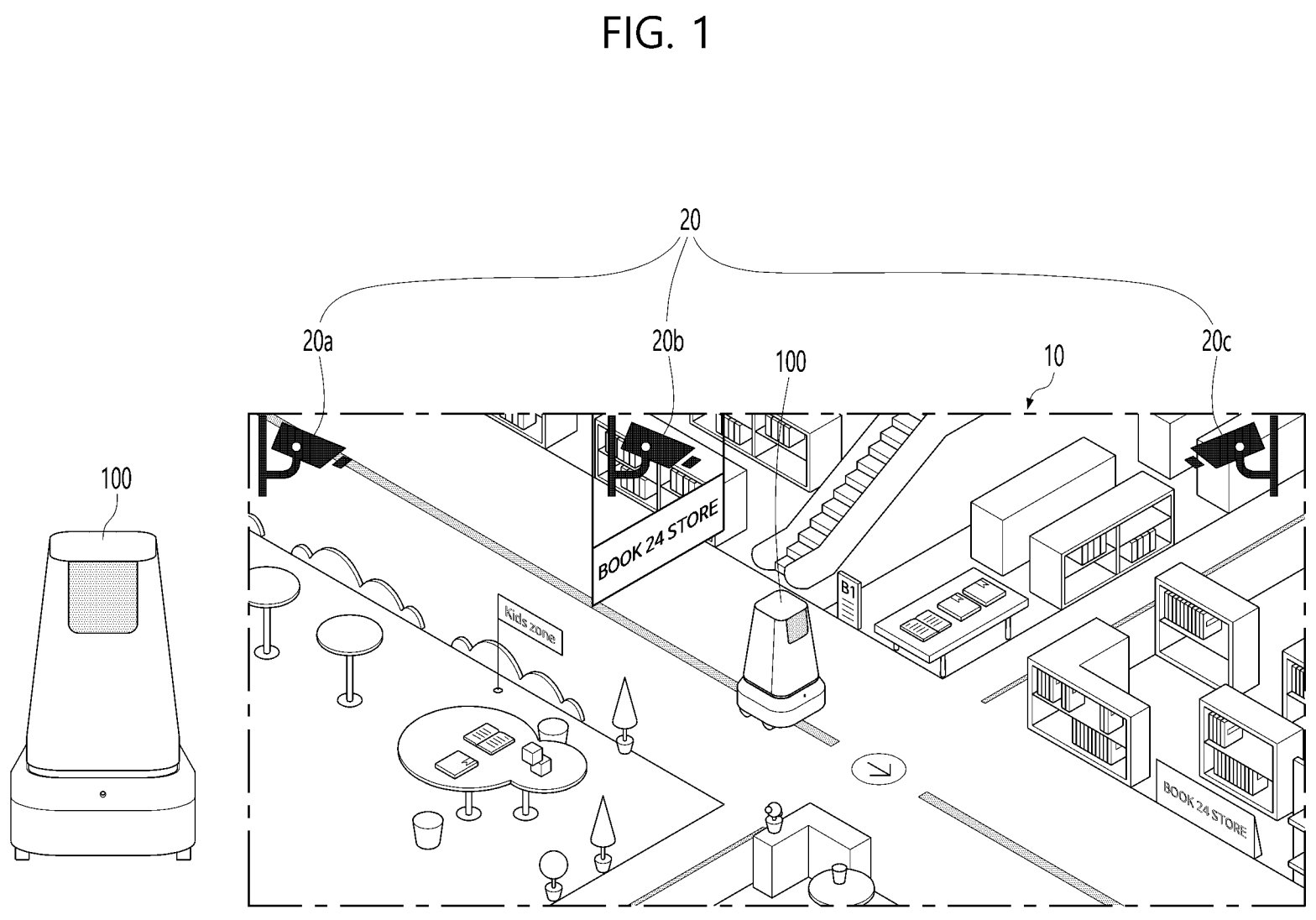

The present invention provides a method and a system for controlling traveling of robots, and more specifically, a method and a system for efficiently controlling moving paths of a plurality of robots. Hereinafter, a system for controlling traveling of robots will be described, along with the accompanying drawings. FIGS. 1 and 2 are conceptual views for describing a method and a system for remotely controlling robots according to the present invention.

For example, as illustrated in FIG. 1, robots are becoming increasingly utilized with the advancement of technology. While robots in the related art are used in specialized industries (e.g., in the field of industrial automation), robots are increasingly being transformed into service robots that are capable of performing useful tasks for humans or facilities.

As described above, robots capable of providing a variety of services may be configured to travel through a space 10 as illustrated in FIG. 1 in order to perform assigned tasks. There is no limitation on types of spaces that robots travel through, and the robots may be configured to travel through at least one of indoor and outdoor spaces, as necessary. For example, an indoor space may be a variety of spaces, such as a department store, airport, hotel, school, building, subway station, train station, bookstore, etc. As described above, robots may be configured to provide useful services to humans by being disposed in a variety of spaces.

Meanwhile, in order to provide various services using robots, it is a very important factor to control the robot accurately. Accordingly, the present invention proposes a method for remotely controlling robots more accurately by using spatially disposed cameras together.

As illustrated in FIG. 1, cameras 20 may be disposed in a space 10 where a robot is positioned. As illustrated, the number of the cameras 20 disposed in the space 10 is not limited. As illustrated, a plurality of cameras 20a, 20b, and 20c may be disposed in the space 10. Types of the cameras 20 disposed in the space 10 may vary, and in the present invention, in particular, a closed circuit television (CCTV) disposed in the space may be used.

As illustrated in FIG. 2, according to the present invention, in a system 300 for remotely controlling robots, a robot R may be administered and controlled remotely.

The system for remotely controlling robots R according to the present invention may use at least one of images received from the cameras 20 (e.g., CCTV) disposed in the space 10, images received from the robots, information received from sensors provided on the robots, and information received from various sensors provided in the space to control traveling of the robots, or to perform appropriate controls on the robots.

As illustrated in FIG. 2, the system 300 for remotely controlling robots according to the present invention may include at least one of a communication unit 310, a storage unit 320, a display unit 330, an input unit 340, and a control unit 350.

The communication unit 310 may be configured to communicate with various devices disposed in the space 10, either wired or wirelessly. The communication unit 310 may communicate with the robot R, as illustrated. The communication unit 310 may be configured to receive an image taken from a camera provided on the robot R through communication with the robot R.

Further, the communication unit 310 may perform direct communication with the camera 20. Further, the communication unit 310 may be configured to communicate with an image control system 2000 that controls the cameras 20. When communications are established between the image control system 2000 and the communication unit 310, the system 300 for remotely controlling robots may receive images being taken (or received) by the cameras 20 from the image control system 2000 through the communication unit 310.

Further, the communication unit 310 may be configured to communicate with at least one external server (or external storage, 200). Here, the external server 200 may be configured to include at least one of a cloud server 210 or a database 220, as illustrated. Meanwhile, the external server 200 may be configured to perform at least some of the roles of the control unit 350. That is, data processing, data calculation, or the like may be performed on the external server 200, and the present invention does not place any specific limitation on these methods.

Meanwhile, the communication unit 310 may support various communication methods depending on the communication standards of devices to be communicated with.

For example, the communication unit 310 may be configured to communicate with devices (including the cloud server) positioned inside or outside of the space 10 using at least one of wireless LAN (WLAN), wireless-fidelity (Wi-Fi), wireless-fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), fifth generation mobile telecommunication (5G), Bluetooth™, radio frequency identification (RFID), infrared communication (infrared data association (IrDA)), ultra-wideband (UWB), ZigBee, near field communication (NFC), Wi-Fi direct, and wireless universal serial bus (wireless USB) technologies.

Next, the storage unit 320 may be configured to store various information related to the present invention. In the present invention, the storage unit 320 may be provided in the system 300 for remotely controlling robots. In contrast, at least a portion of the storage unit 320 may mean at least one of the cloud server 210 and database 22. That is, it can be understood that the storage unit 320 is sufficient to be a space in which information necessary for controlling robots according to the present invention is stored, and there is no restriction on a physical space. Accordingly, hereinafter, the storage unit 320, cloud server 210, and database 220 will all be referred to as the storage unit 320, without distinguishing separately. In this case, the cloud server 210 may mean "cloud storage". Further, the storage unit 320 may be configured to store information on the system 300 for remotely controlling robots, as well as various information related to the image control system 2000. First, in the storage unit 320, information on the robots R may be stored.

The information on the robots R may vary widely, and the information on the robots R may include, for example, i) identification information for identifying the robots R disposed in the space 10 (e.g., serial numbers, TAG information, QR code information, etc.), ii) mission information assigned to the robots R, iii) traveling path information set for the robots R, iv) position information on the robots R, v) state information on the robots R (e.g., power state, whether there is a failure, battery state, etc, vi) image information received from a camera provided on the robot R, and the like.

Next, in the storage unit 320, a map (or map information) of the space 10 may be stored. Here, the map may be configured as at least one of a two-dimensional or three-dimensional map. The map of the space 10 may mean a map that may be used to identify the current positions of the robot R, or to set a traveling path of the robot.

In particular, in the system 300 for remotely controlling robots according to the present invention, a position of the robot R may be identified based on an image received from the robot R or information received from the robot R. To this end, the map of the space 10 stored in the storage unit 320 may be configured with data that allows a position to be estimated based on image or sensing information.

In this case, the map of the space 10 may be a map created based on a simultaneous localization and mapping (SLAM) by at least one robot moving through the space 10 in advance.

Next, in the storage unit 320, information on the cameras 20 may be stored.

The information on the cameras 20 may vary widely, and the information on the cameras 20 may include, i) identification information on each of cameras 20a, 20b, 20c, 20d . . . (e.g., serial number, TAG information, QR code information, etc.), ii) disposition position information on each of the cameras 20a, 20b, 20c, 20d . . . (e.g., information on which position each of the cameras 20a, 20b, 20c, 20d . . . is disposed in the space), iii) angle of view information on each of the cameras 20a, 20b, 20c, 20d . . . (e.g., information on which view of the space is being taken by each of the cameras 20b, 20c, 20d . . . ), iv) state information on each of the cameras 20a, 20b, 20c, (e.g., power state, whether there is a failure, battery state, etc.), v) image information received from each of the cameras 20a, 20b, 20c, 20d . . . , and the like.

Meanwhile, the information on the cameras 20 listed above may be present to be matched with each other with respect to each of the cameras 20a, 20b, 20c, 20d . . . .

For example, in the storage unit 320, at least one of identification information, position information, angle of view information, state information, and image information on a specific camera 20a may be matched and present as matching information. When a position where an image is desired later to be viewed is specified, this matching information may be usefully used to specify a camera at the corresponding position.

Meanwhile, in addition to the types of information listed above, a variety of information may be stored in the storage unit 320.

Next, the display unit 330 may be configured to output an image received from at least one of the cameras provided on the robot R and the cameras 20 disposed in the space 10. The display unit 330 is provided on a device of an administrator who remotely administer the robots R, and may be provided in a remote control room 300a, as illustrated in FIG. 2. Further, in contrast, the display unit 330 may be a display provided on a mobile device. As described above, the present invention does not limit a type of the display unit.

Next, the input unit 340 is for inputting information from a user (or an administrator), and the input unit 340 may be a medium between a user (or an administrator) and the system 300 for remotely controlling robots. More specifically, the input unit 340 may mean an input means for receiving a control command for controlling the robots R from a user.

In this case, there is no specific limitation on types of input unit 340, and the input unit 340 may include at least one of a mechanical input means (or a mechanical key, e.g., a mouse, a joystick, a physical button, a dome switch, a jog wheel, a jog switch, etc.) and a touch input means. As an example, the touch input means may include virtual keys, soft keys, or visual keys that are displayed on a touchscreen through software processing, or touch keys that are disposed on a portion other than the touchscreen. Meanwhile, the virtual or visual keys may be displayed on the touchscreen in a variety of forms, and may be configured to be, for example, a graphic, a text, an icon, a video, or a combination thereof. In this case, when the input unit 340 includes the touchscreen, the display unit 330 may be configured as the touchscreen. In this case, the display unit 330 may perform both a role of outputting information and a role of receiving information.

Next, the control unit 350 may be configured to control an overall operation of the system 300 for remotely controlling robots related to the present invention. The control unit 350 may process signals, data, information, and the like that are input or output through the constituent elements described above, or may provide or process appropriate information or functions to a user. The control unit 350 may be implemented using any type of device capable of processing data, such as a processor. Here, the processor may refer to a hardware built-in data processing device having a circuit physically structured to perform functions expressed in codes or instructions included in computer programs. The components or units of the control unit 350 may be dedicated portions of the processor for performing their respective functions, or they may be representations of different functions performed by the overall control unit 350 in response to control instructions provided from a program code. It is also contemplated that the components or units may be implemented as individual processors performing their respective functions.

In particular, the control unit 350 may perform controls necessary to set a moving path of the robot using pre-stored map information.

In the above description, an example in which the control unit 350 estimates the position of the robot R has been described, but the present invention is not limited thereto. That is, estimating the position of the robot R can be performed by the robot R itself. The robot R may estimate the current position in the manner described above, based on an image received by the robot R itself. Further, the robot R may transmit the estimated position information to the control unit 350. In this case, the control unit 350 may perform a series of controls based on the position information received from the robot.

Meanwhile, the image control system 2000 may be configured to control at least one of the cameras 20 disposed in the space 10. As illustrated, a plurality of cameras 20a, 20b, 20c, 20d, . . . may be disposed in the space 10. Each of the plurality of cameras 20a, 20b, 20c, 20d, . . . may be disposed at a different position in the space 10. The image control system 2000 may be used to set a moving path of the robot R and to detect obstacles to be described later.

Meanwhile, according to the above description, in the present invention, the image control system 2000 and the system 300 for remotely controlling robots have been described as separate configurations. However, the present invention is not limited thereto, and the image control system 2000 and the system for remotely controlling robots 300 may be configured as one integrated system.

Figure 3:
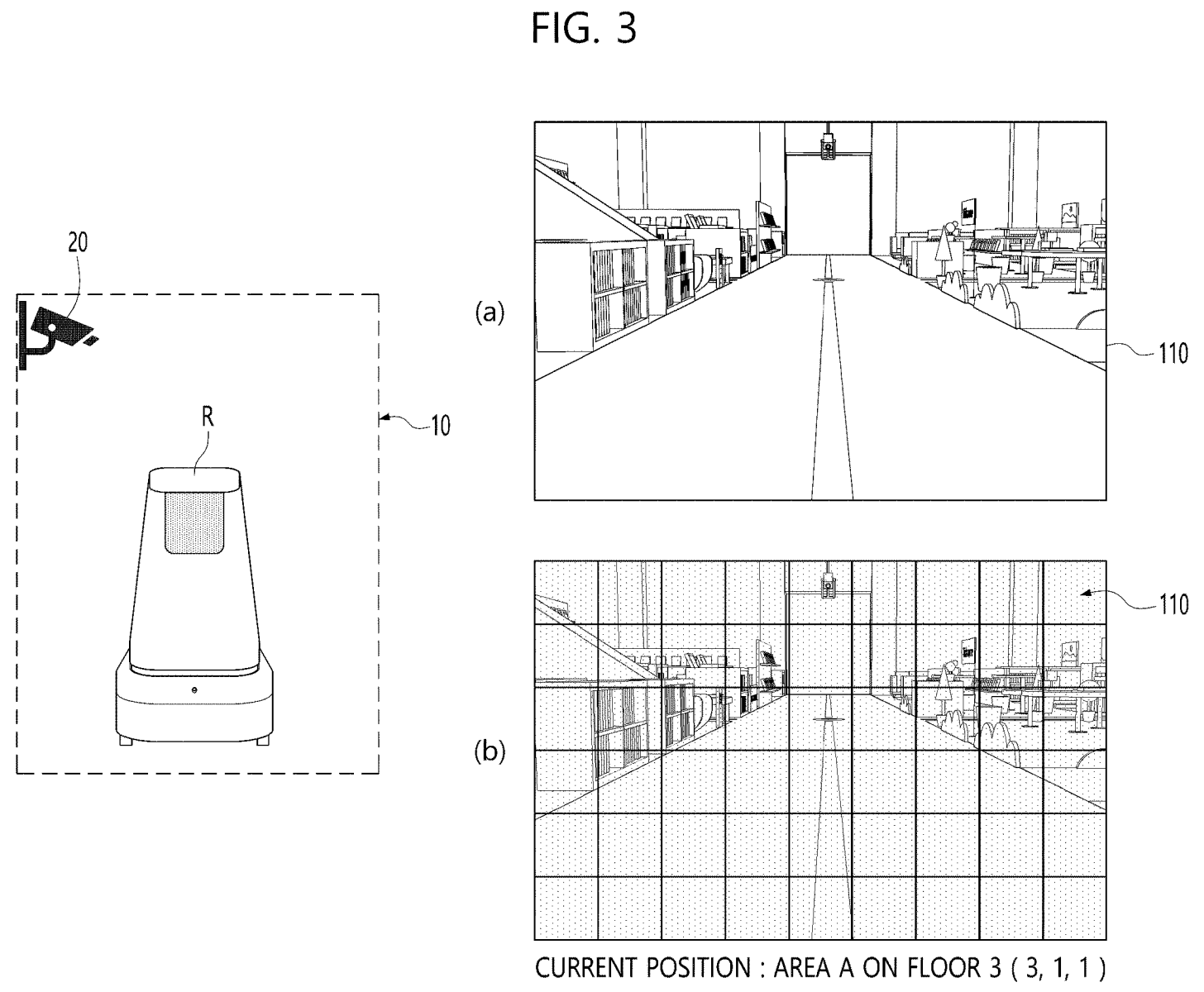

Hereinafter, a method of estimating the current position of the robot R based on an image received from the robot R will be described in more detail with reference to the accompanying drawings. FIG. 3 is a conceptual view for describing a method of estimating the current position of a robot and an image collected from the robot, in the method and the system for remotely controlling robots according to the present invention.

As described above, the control unit 350 according to the present invention is configured to receive an image of the space 10 using a camera (not illustrated) provided on the robot R, and to perform visual localization to estimate a position of the robot R from the received image. In this case, the camera provided on the robot R is configured to take (or sense) an image of the space 10, i.e., an image around the robot R. Hereinafter, for convenience of description, an image acquired using a camera provided on the robot R will be referred to as a "robot image." Further, an image acquired through the cameras disposed in the space 10 will be referred to as a "space image."

The control unit 350 is configured to acquire a robot image 110 through the camera provided on the robot R, as illustrated in FIG. 3(*a*). Further, the control unit 350 may estimate the current position of the robot R using the acquired robot image.

The control unit 350 may extract position information (e.g., "area A on floor 3 (3, 1, 1)") corresponding to the current position of the robot R by comparing the robot image 110 with map information stored in the storage unit 320, as illustrated in FIG. 3(*b*).

As described above, the map of the space 10 in the present invention may be a map created based on a simultaneous localization and mapping (SLAM) by at least one robot moving through the space 10 in advance. In particular, the map of the space 10 may be a map generated based on image information.

That is, the map of the space 10 may be a map generated by the vision (or visual) based SLAM technology.

Therefore, the control unit 350 may specify coordinate information (e.g., (area A on floor 3 (3, 1, 1,)) for the robot image 110 acquired from the robot R, as illustrated in FIG. 3(*b*). As described above, the specified coordinate information may be information on the current position of the robot R.

In this case, the control unit 350 may estimate the current position of the robot R by comparing the robot image 110 acquired from the robot R with the map generated by the vision (or visual) based SLAM technology. In this case, the control unit 350 may i) specify an image most similar to the robot image 110 using an image comparison between the robot image 110 and images constituting the pre-generated map, and ii) specify position information of the robot R in a method of acquiring the position information matched to the specified image.

As described above, when the robot image 110 is acquired from the robot R, the control unit 350 may specify the current position of the robot using the acquired robot image 110, as illustrated in FIG. 3(*a*). As described above, the control unit 350 may extract position information (e.g., coordinate information) corresponding to the robot image 110 from the map information (e.g., which may also be referred to as a "node map") pre-stored in the storage unit 320.

Meanwhile, in the above description, an example in which the control unit 350 estimates the position of the robot R has been described, but as described above, estimating of the position of the robot R may be performed by the robot R itself. That is, the robot R may estimate the current position in the method described above, based on an image received by the robot R itself. Further, the robot R may transmit the estimated position information to the control unit 350. In this case, the control unit 350 may perform a series of controls based on the position information received from the robot.

Meanwhile, in the example above, a method of estimating the position of the robot R based on the image received from the robot R or the image received through the camera provided in the space 10 has been described, but the present invention is not limited thereto. That is, in the present invention, it is possible to estimate the position of the robot through various sensors disposed on the robot or in the space in addition to the method using the image, and the present invention is not particularly limited thereto.

Meanwhile, as described above, in the present invention, a moving path of the robot R may be set in the space 10, using the map information pre-stored in the storage unit 320. The control unit 350 may control the robot R to move from the current position to a specific destination. Specifically, in the present invention, current position information and destination position information of the robot R are specified, a path to reach the destination is set, and the robot R is controlled to move according to the set path to reach the destination.

However, the map information that will be described below describes one example of map information that is used to set the moving path of the robot, and the method of remotely controlling robots according to the present invention is not performed solely by the map information that will be described below.

Figure 4:
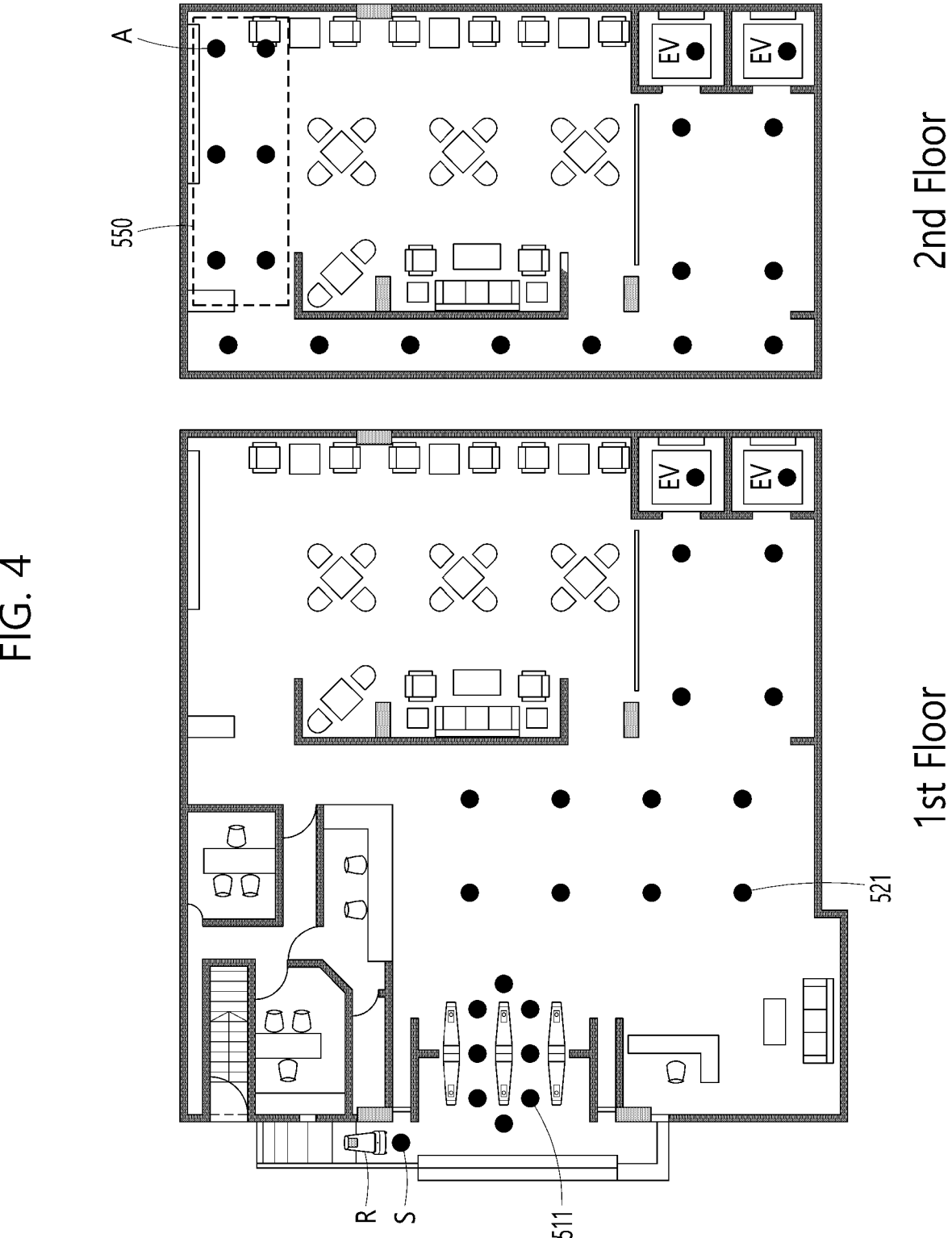
FIG. 4 is a conceptual view illustrating map information used to set a path of a robot.

As described above, in the storage unit 320, the map (or map information) of the space 10 may be stored. With reference to FIG. 4, the map of the space 10 stored in the storage unit 320 may be configured in the form of a two-dimensional top plan view, but is not limited thereto.

Meanwhile, as illustrated in FIG. 4, the map information may include a plurality of nodes (e.g., 511). In the present specification, a "node" means a point or an area that serves as a unit target for the movement of the robot. A node may include at least two pieces of information.

First, a node includes coordinate information. A single node specifies a specific coordinate or a range of coordinates on the map. For example, a node may be configured to specify a circular area on the map with a certain area. To this end, the coordinate information included in a node may be configured as a specific coordinate or a range of coordinates.

Second, a node includes connection information. A single node includes information that defines another node to which the robot is able to move from the corresponding node. The connection information may include a unique number of another node to which the robot is able to move from the corresponding node, or coordinate information specified by another node.

The control unit 350 may control the robot to move from one node to another node, and repeat this process to control the robot to reach a target point. In the present specification, the robot moving to a specific node may mean that the robot moves to coordinate information or within a range of coordinates that the specific node specifies.

In the present invention, a moving path for moving the robot from a current position S to a destination A is set using the method of estimating the position information described above and the map information, and then transmitted to the robot. However, the method using the node map is only one embodiment of controlling traveling of the robot, and in the present invention, the moving path of the robot may be set using other means than the node map described above.

The present invention proposes a method and a system for remotely controlling robots that are capable of providing an optimal moving path for a plurality of robots in consideration of obstacles when the obstacles are detected on moving paths of the robots after the moving paths are transmitted to the robots.

Figure 5:
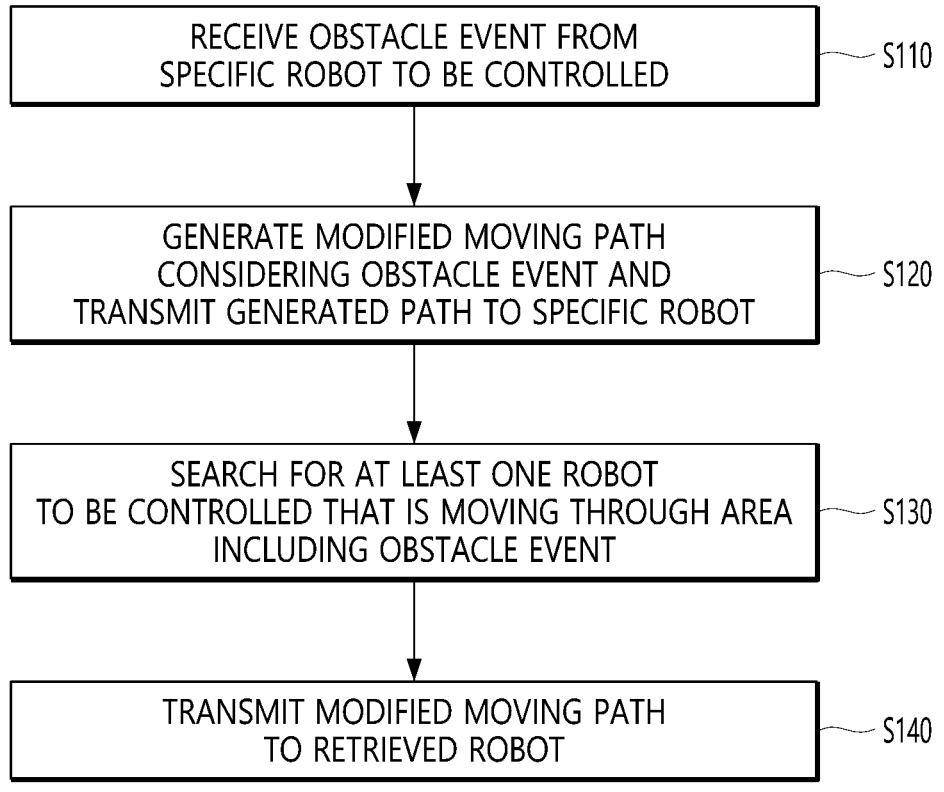
FIG. 5 is a flowchart for describing a method of remotely controlling robots according to the present invention.

The present invention may provide a method and a system for remotely controlling robots that are capable of reflecting information on obstacles to moving paths of different robots by sharing the information on obstacles or the like to a server when an obstacle event occurs in which a specific robot is unable to move along a designated moving path due to the obstacles or the like while traveling. Hereinafter, a method and a system for remotely controlling robots will be described in more detail with reference to the accompanying drawings. FIG. 5 is a flowchart for describing a method of remotely controlling robots according to the present invention, and FIGS. 6A, 6B, 6C, and 6D are conceptual views illustrating a method of remotely controlling robots according to the present invention.

First, in a method of remotely controlling robots according to the present invention, a process of receiving an obstacle event from a specific robot to be controlled may proceed (S110).

The control unit 350 sets a moving path of each robot through communication with a plurality of robots to be controlled. For example, the control unit 350 may control the robot so that the robot moves along a first path.

Figure 6A:
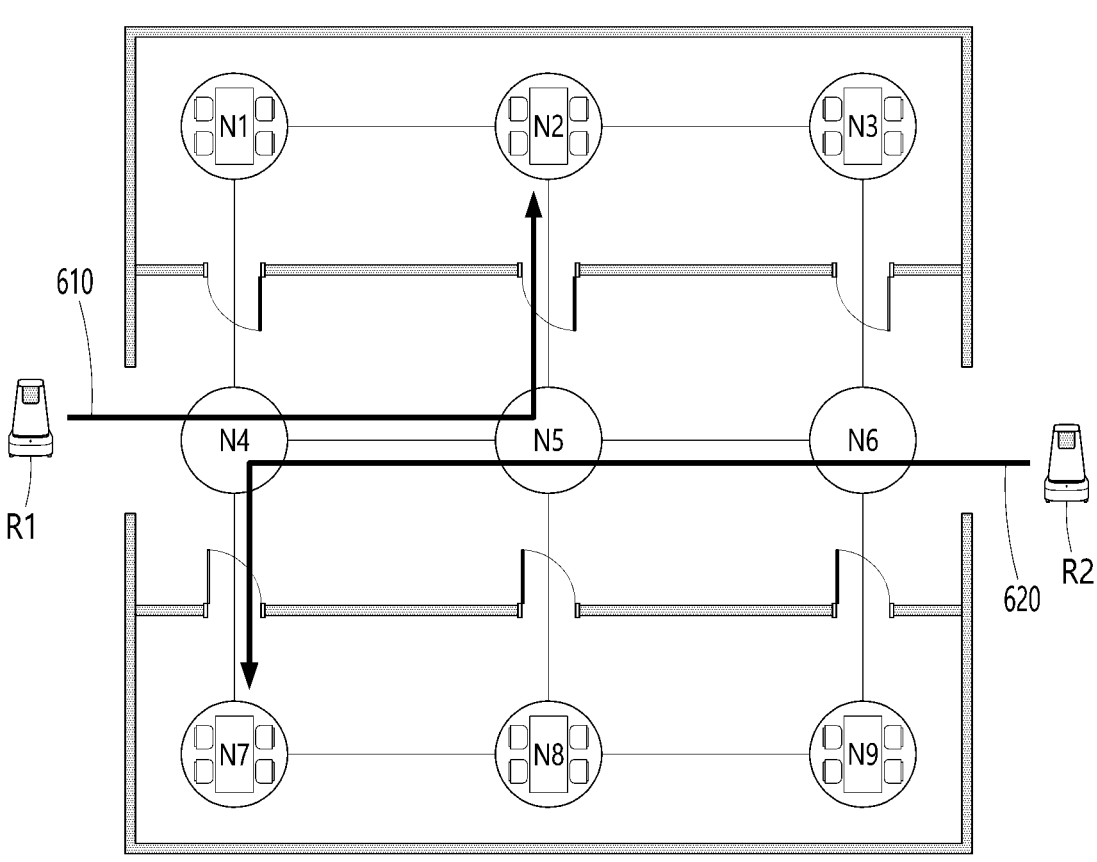
FIGS. 6A, 6B, 6C, and 6D are conceptual views illustrating the method of remotely controlling robots according to the present invention.

For example, as illustrated in FIG. 6A, the control unit 350 transmits moving paths 610 and 620 to each of a plurality of robots R1 and R2 that are controlled, so that the control unit 350 allows each of the plurality of robots to move to a destination for performing a mission. A first robot R1 receives an initial moving path along which the first robot R1 sequentially passes through N4 and N5 (i.e., node 4 to node 5) to reach a destination N2 (node 2), and then travels according to the received moving path. Meanwhile, a second robot R2 receives an initial moving path along which the second robot R2 sequentially passes through N6, N5, and N4 to reach a destination N7, and may travel according to the received moving path.

The moving paths may include current position information on the robots, destination information, and information on areas (or node information) that the robots pass through to reach the destinations. The robots may travel to the destinations by passing through areas included in the moving paths.

When a specific robot traveling on the first path detects obstacles in a specific area, the robot may transmit information on the obstacles to the system 300 for remotely controlling robots.

While traveling along the moving path, the robot may determine, using at least one of sensors and cameras included with the robot, whether obstacles are present in the moving path of the robot. However, the present invention is not limited thereto, and the system 300 for remotely controlling robots may determine whether obstacles are present based on information received from the robot, without the robot determining whether obstacles are present.

In the present specification, "a robot detecting obstacles" may be used to mean that the robot determines the presence of obstacles using at least one of sensors and cameras included with the robot, or may be used to mean that the system 300 for remotely controlling robots determines the presence of obstacles based on information received from the robot.

When the robot detects obstacles and is unable to pass through a specific area, the robot may transmit at least one of whether an obstacle event has occurred and information on the obstacles to the system 300 for remotely controlling robots.

Figure 6B:
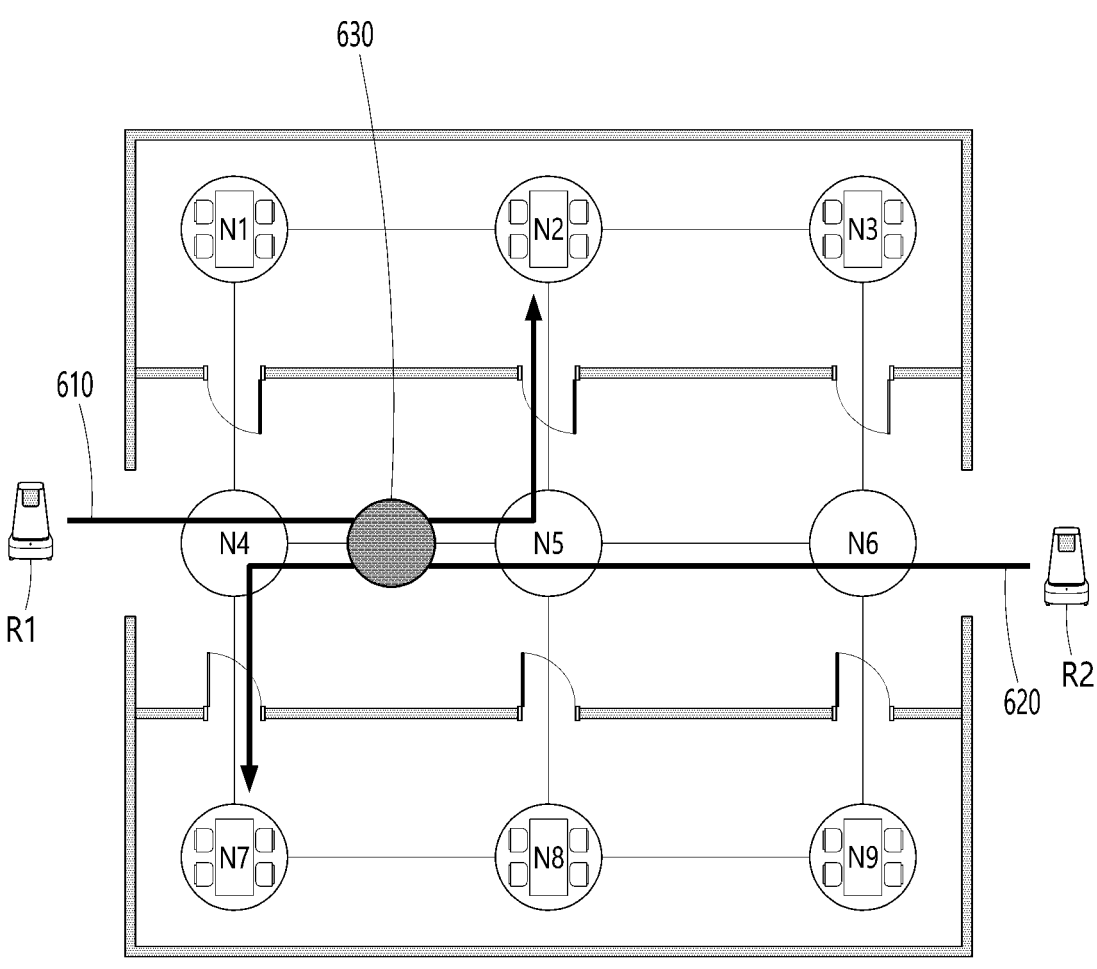

For example, as illustrated in FIG. 6B, one robot R1 of the plurality of robots may first detect an obstacle 630 while traveling along a traveling path, and transmit whether an obstacle event has occurred and information related to the obstacle to the system 300 for remotely controlling robots. In this case, a different robot R2 may move along an initial traveling path 620 without detecting the obstacle 630.

Meanwhile, even when the robot has taken longer than a preset time to pass through a specific area, the robot may transmit at least one of whether an obstacle event has occurred and information on the obstacle to the system 300 for remotely controlling robots.

Here, the information on the obstacle may include at least one of the type and the size of the obstacle analyzed by the robot, or at least one of information sensed from sensors included in the robot and images taken by cameras included in the robot.

Meanwhile, the control unit 350 collects information on obstacles in other ways in addition to the information received from the robot. Specifically, the cloud server 210 monitors the current position of the robot in real-time or at preset time intervals. When receiving an obstacle event from the robot, the control unit 350 may take an image around the robot using a camera that is within a certain distance from the current position of the robot.

Further, the control unit 350 collects the moving path of the robot before a certain period of time from a time point of receiving the obstacle event. That is, the control unit 350 may collect the moving path of the robot in an area where the obstacle event occurred.

The control unit 350 determines whether the obstacle event has actually occurred, and determines the types of obstacles, using information received from the robot and information collected by the system 300 for remotely controlling robots. Specific embodiment of this is described below.

Next, the control unit 350 may generate a modified moving path in consideration of the obstacle event received from the specific robot and transmit the modified moving path to the specific robot (S120).

When determining that the obstacle event received from the specific robot has actually occurred, the control unit 350 may transmit to the specific robot a modified moving path along which the specific robot is able to reach a destination included in the initial moving path of the specific robot without passing through the area where the obstacle event occurred.

The system 300 for remotely controlling robots generates a second path that avoids the specific area based on the obstacle event. In this case, the control unit 350 may modify at least a portion of the first path such that the specific area is excluded from the first path.

Figure 6C:
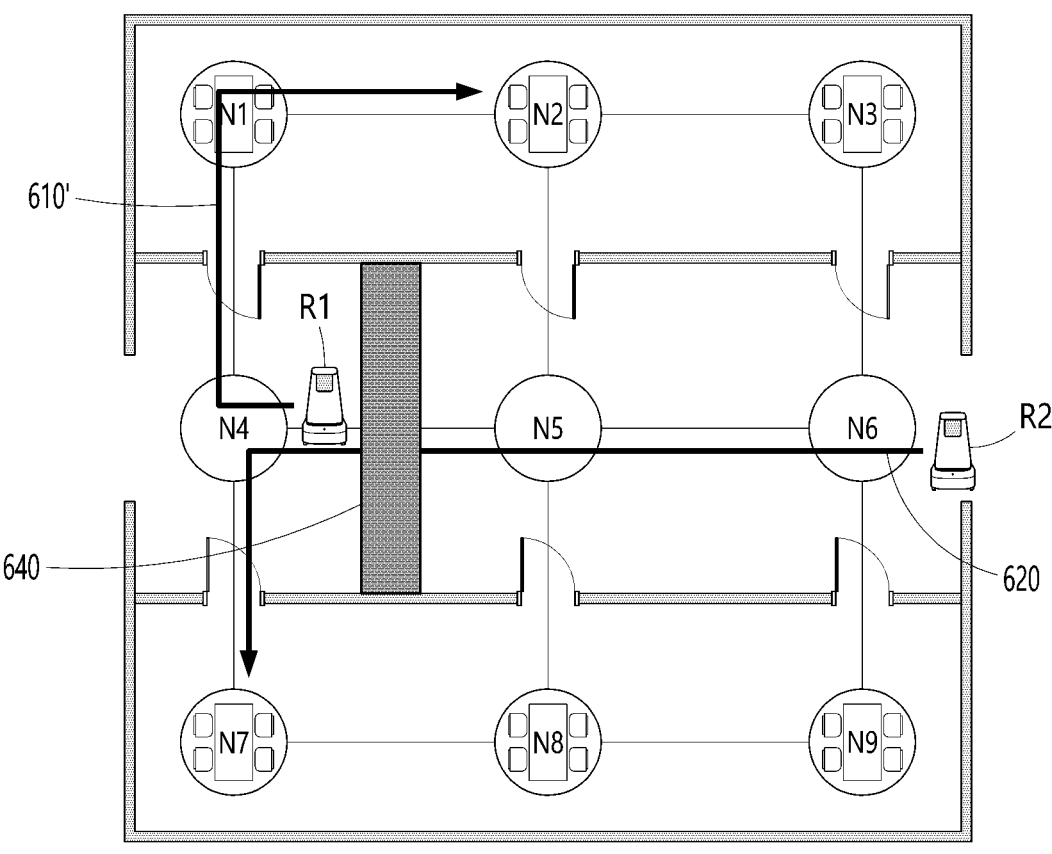

In an embodiment, with reference to FIG. 6C, the control unit 350 may transmit to the first robot R1 a modified moving path 610' along which a robot is able to sequentially pass through N4 and N1 and reach the destination, N2, without passing through an area 640 where an obstacle event has occurred.

Meanwhile, a destination of the second path may be related to the destination of the first path. The destination of the second path being related to the destination of the first path means that the destination of the second path is the same as the destination of the first path, or is a destination for a mission related to the first path.

For example, when the first path is a moving path for performing a first mission, the destination of the second path may be different from the destination of the first path in the case where the destination for performing the first mission has changed.

Specifically, when generating the second path, the control unit 350 determines whether an avoidance path is present along which a robot avoids the specific area and reaches the destination of the first path. As a result of the determination, the control unit 350 generates the second path including the destination of the first path, when the avoidance path is present, and performs different control related to the mission assigned to the specific robot depending on the mission characteristic of the mission assigned to the specific robot, when the avoidance path is not present. In this case, the destination of the second path may be different from the destination of the first path.

Here, when the mission assigned to the specific robot has a characteristic of a first mission that is transferable to a robot different from the specific robot, the different control may include a first control that assigns the mission assigned to the specific robot to the different robot.

The first control may include generating a moving path of the different robot, such that the mission assigned to the specific robot is performed by the different robot. In this case, the destination corresponding to the moving path of the different robot may correspond to the destination of the first path. Meanwhile, when the mission assigned to the specific robot is assigned to the different robot, the moving path set for the specific robot may be canceled.

In contrast, when the mission assigned to the specific robot has a characteristic of a second mission that is not transferable to a robot different from the specific robot, the different control may include a second control that moves the specific robot to the specific area.

A specific embodiment of the first control and the second control will be described below with reference to FIGS. 9A, 9B, and 10.

Meanwhile, in the present invention, types of obstacles are determined, and the types of obstacles are used to set a detour path, or to monitor whether the obstacles are resolved, as will be described below Hereinafter, a method of determining types of obstacles in the system for remotely controlling robots and modifying map information based on the determined types of obstacles is described.

Figure 7A:
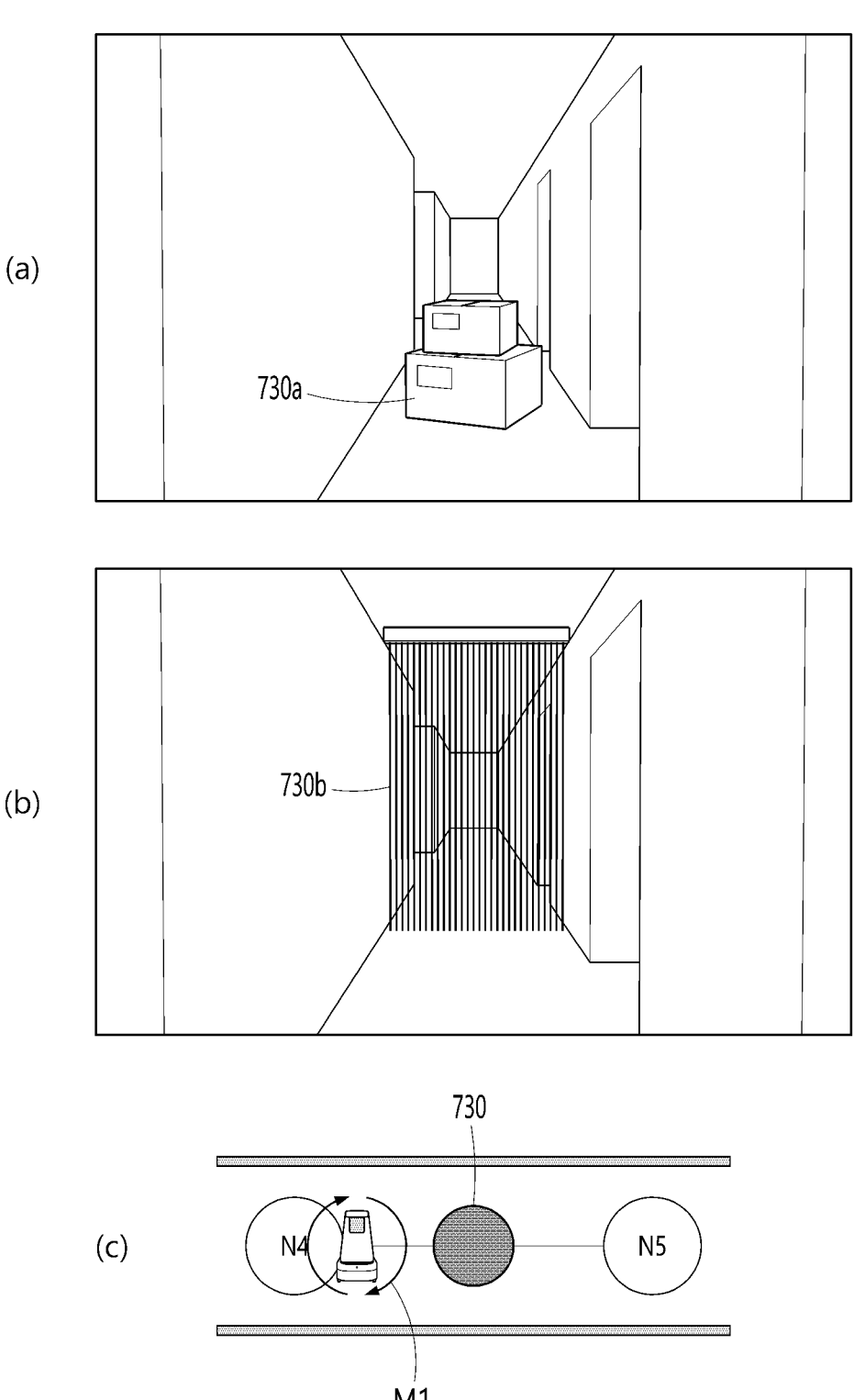
FIGS. 7A and 7B are conceptual views illustrating types of obstacle events and moving paths of robots with respect to obstacles.
Figure 7B:
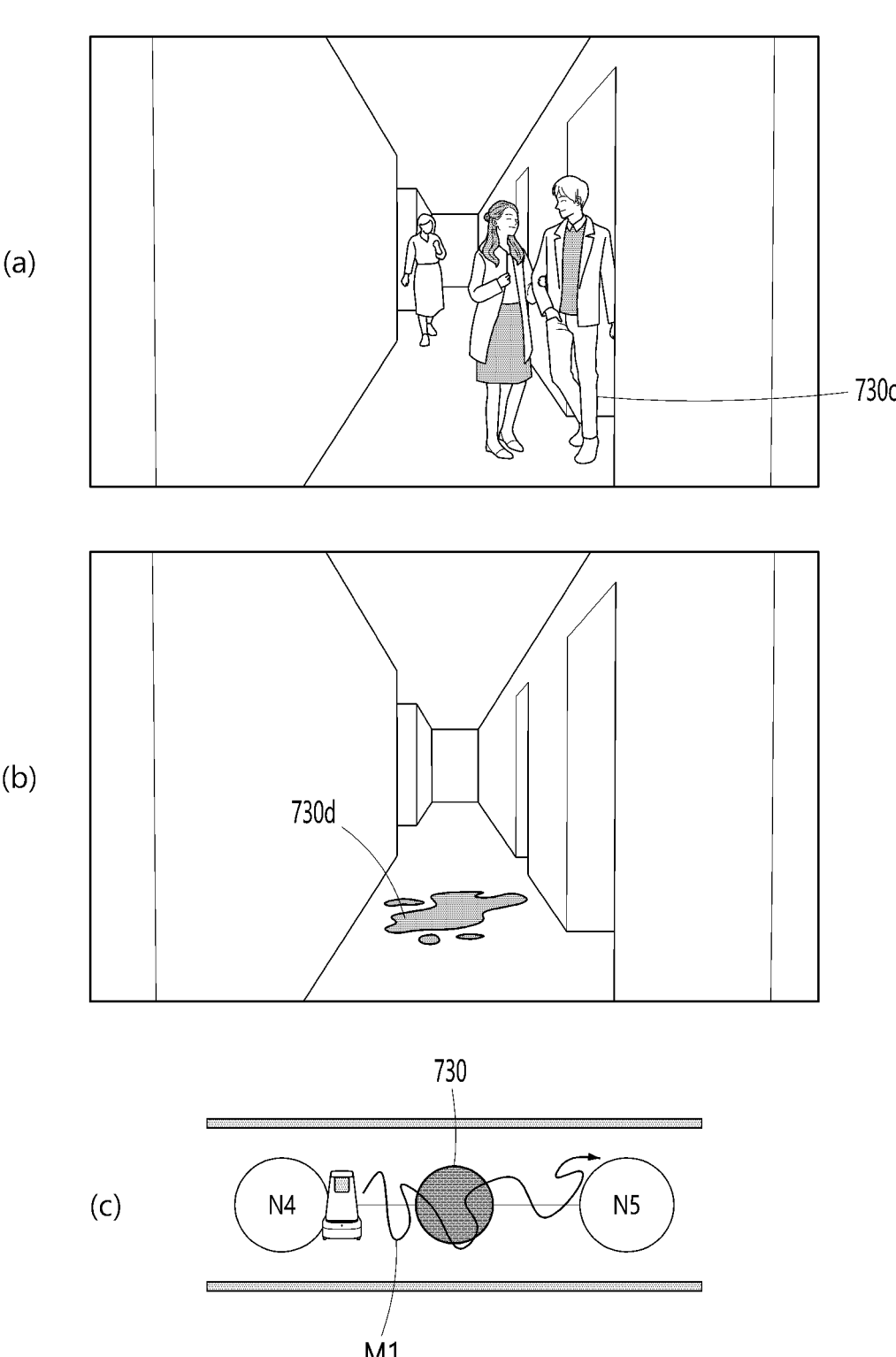

FIGS. 7A and 7B are conceptual views illustrating types of obstacle events and moving paths of robots with respect to obstacles.

Meanwhile, the control unit 350 may determine types of obstacles and set the area including the obstacle event as an area of interest based on the types of obstacles, using at least one of information sensed from sensors included in the robot, an image taken by cameras included in the robot, and information collected by the system 300 for remotely controlling robots.

In an embodiment, the storage unit 320 may store a list of types of obstacle events, and the control unit 350 may determine shapes and sizes of the obstacles using at least one of information sensed from sensors included in the robot, images taken by cameras included in the robot, and information collected by the system 300 for remotely controlling robots. Thereafter, the control unit 350 may set a type of obstacle to one of the types of obstacles included in the above list based on the shapes and sizes of obstacles.

In another example, the control unit 350 may output a list of obstacles and at least one of the images taken by the cameras included in the robot and the images taken by the cameras around the robot, and receive a selection of a type of obstacle from a user.

When setting the type of obstacle by receiving the selection of the type of obstacle from the user, the control unit 350 may receive an expected resolution time of the obstacle from the user as input. Information received from the user may be stored in map information. In an embodiment, in the case where the expected resolution time has elapsed from a time point of receiving the obstacle event, the control unit 350 may release the area containing the obstacle event from the area of interest.

Therefore, in the present invention, when a predictable obstacle event (e.g., scheduled construction) occurs in a specific area, the administrator may set a time of releasing the obstacle event, so that the obstacle event is released after a certain period of time without the administrator being required to make additional observations to determine whether the obstacle event has been resolved.

Meanwhile, the control unit 350 may update information on the area including the obstacle event from the pre-stored map information based on the type of obstacle.

In an embodiment, the control unit 350 may set the area including the obstacle event into a different type of area based on the type of obstacle.

For example, the system 300 for remotely controlling robots sets the area in which the obstacle is detected to one of an untravellable area, a congestion area, or an obstructed travel area depending on the type of obstacle.

When a specific area is set as an untravellable area, the control unit 350 may transmit to the at least one robot a modified path along which the robot is able to reach a destination without passing through the untravellable area.

When a specific area is set as a congestion area, the control unit 350 calculates an expected time to pass through the congestion area based on obstacle information, and determines whether to modify the path of the specific robot in consideration of the expected time to pass through the congestion area. Specifically, the control unit 350 may not modify the path of the specific robot in the case where, when the path of the specific robot is modified, an expected time to reach the destination by passing through the area including the obstacle event is shorter than the expected time to reach the destination.

When a specific area is set as an obstructed travel area, the control unit 350 calculates the level of difficulty of passing through the congestion area based on obstacle information, and determines whether to modify the path of the specific robot in consideration of the level of difficulty of passing through the obstructed travel area. Specifically, the control unit 350 may not modify the path of the specific robot when it determines that means by which the specific robot travels the path is suitable for the level of difficulty of passing the path.

Meanwhile, the present invention is not limited thereto, and an area feature may be set based on the number of times of monitoring whether the obstacle event has been resolved. This will be described with the description of a method of monitoring obstacles.

Hereinafter, with reference to the accompanying drawings, embodiments in which the system 300 for remotely controlling robots sets types of obstacles and updates map information according to the types of obstacles will be described.

In an embodiment, with reference to FIG. 7A, when the robot is traveling from N4 to N5 and determines that it is unable to move through a specific area, the robot may hover and stand by on a moving path M1 around an obstacle 730.

In addition, the robot transmits information related to whether an obstacle event has occurred and the information relating to obstacle to the system 300 for remotely controlling robots. The system 300 for remotely controlling robots may set the type of the obstacle using an image taken from the robot ((a) and (b) in FIG. 7A) and the moving path M1 of the robot.

As illustrated in (a) of FIG. 7A, when the image received from the robot includes an obstacle 730*a* that the robot is unable to pass through, the control unit 350 may modify the map information for the area where the obstacle 730*a* is positioned. Specifically, the system 300 for remotely controlling robots sets the area in which the obstacles 730*a* are positioned as an untravellable area in the pre-stored map information. In addition, the control unit 350 may match the size and the type of the obstacle to the map information and store the same in the map information.

Meanwhile, as illustrated in (b) of FIG. 7A, when the image received from the robot includes an obstacle 730*b* that the robot is able to pass through, the control unit 350 may transmit a control command to allow the robot to pass through the obstacle 730*b*. When the robot travels along an initial moving path, the obstacle event may be released.

In contrast, with reference to FIG. 7B, even if the robot is able to pass a specific area, the control unit 350 may receive an obstacle event for the corresponding area. When the robot is traveling from N4 to N5 and takes more than a preset time to move through a specific area, the robot may transmit information related to whether an obstacle event has occurred and an obstacle to the system 300 for remotely controlling robots.

The system 300 for remotely controlling robots may set a type of the obstacle using an image taken from the robot ((a) and (b) in FIG. 7B) and a moving path M2 of the robot.

As illustrated in (a) of FIG. 7B, when the image received from the robot includes a plurality of obstacles 730*c* that the robot needs to avoid, the control unit 350 modifies the map information for an area where the obstacles 730*c* are positioned, even if the robot is able to pass through the area. Specifically, the system 300 for remotely controlling robots sets the area in which the obstacles 730*a* are positioned as a congestion area in the pre-stored map information. In addition, the control unit 350 may match an expected time to pass through the congestion area to the map information and store the same in the map information.

Meanwhile, as illustrated in (b) of FIG. 7B, when the image received from the robot includes an obstacle 730*d* that hinders the movement of the robot, the control unit 350 modifies the map information for an area in which the obstacle 730*d* is positioned. Specifically, the system 300 for remotely controlling robots sets the area in which the obstacles 730*d* are positioned as an obstructed travel area in the pre-stored map information. In addition, the control unit 350 may match the level of difficulty of passing through the congestion area to the map information and store the same in the map information.

As described above, in the present invention, areas in which obstacles are detected are categorized into different types of areas according to the types of the obstacles. This may be used later to set a detour path of a different robot and control to identify that an obstacle event has been released.

As described above, in the present invention, when a specific robot encounters obstacles while traveling, a detour path that avoids the obstacles is set, or a mission of the specific robot is performed by a different robot, thereby enabling efficient response to changes in the robot traveling environment. Meanwhile, in the present invention, a method of remotely controlling robots may be provided that enables an obstacle event to be reflected in moving paths of all robots to be controlled, not just a robot that has detected the obstacle event.

Hereinafter, a method of remotely controlling robots that is capable of reflecting information on obstacles and the like in moving paths of different robots when an obstacle event occurs will be described.

With reference back to FIG. 5, the control unit 350 may search for at least one robot to be controlled that is moving through an area that includes an obstacle event (S130).

The control unit 350 may search for whether there are different robots having moving paths that include the specific area related to the obstacle event.

Thereafter, the control unit 350 may transmit the modified moving path to the searched robots (S140).

As a result of searching for a different robot, when the different robot exists, the control unit 350 may perform a control related to the different robot.

In an embodiment, the control unit 350 transmits to the searched robot a modified moving path along which the searched robot is able to reach a destination included in the initial moving path of the searched robot, without passing through the area where the obstacle event has occurred.

In this case, the shortest path along which the initial destination may be reached without passing through the area where the obstacle event has occurred is set. Meanwhile, in the case where the moving paths of the plurality of robots are modified due to an obstacle event, the control unit 350 may distribute the moving paths of the plurality of robots so that the congestion level does not increase in a specific area.

Figure 6D:
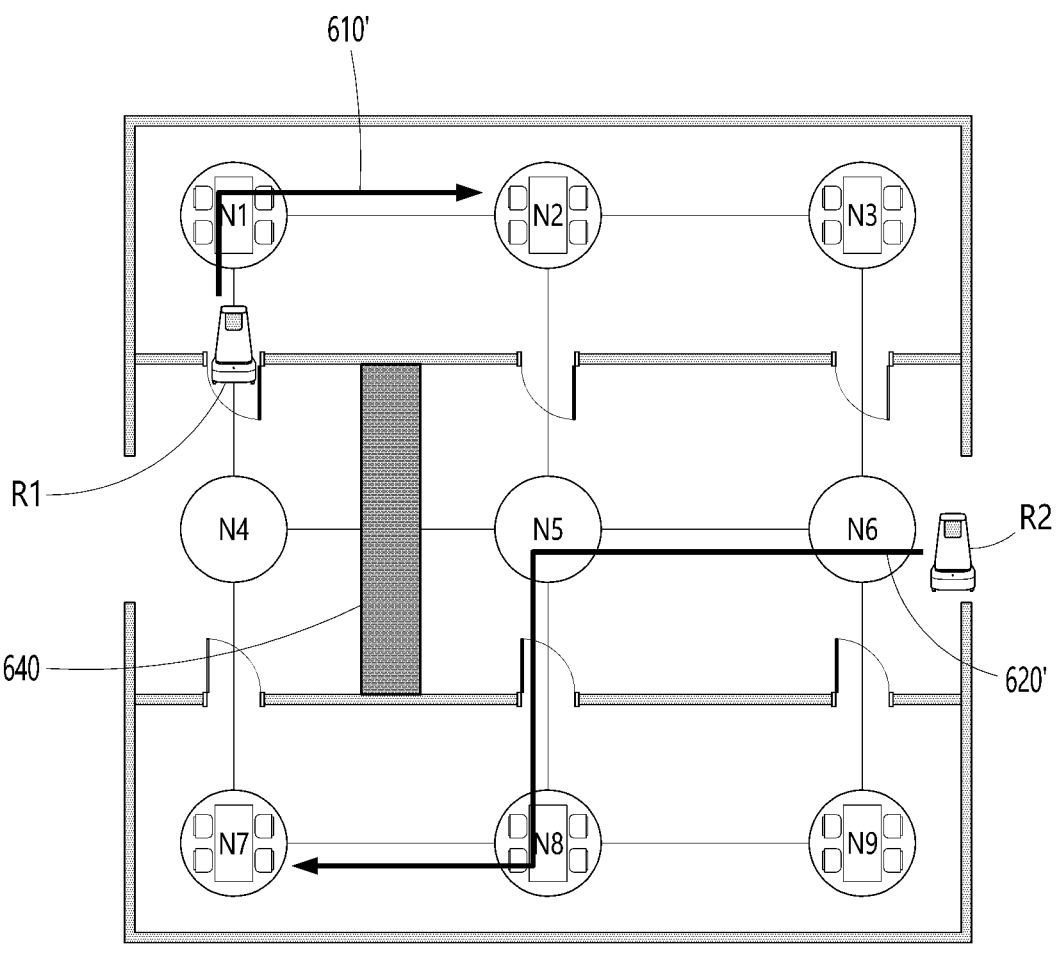

In an embodiment, with reference to FIG. 6D, the control unit 350 may transmit to the first robot R2 a modified moving path 620' along which a robot is able to sequentially pass through N6, N5 and N8 and reach the destination, N7, without passing through an area 640 where an obstacle event has occurred.

Meanwhile, when the moving paths of the plurality of robots are to be modified, the control unit 350 may calculate the expected time for each of the robots requiring the moving path modification to reach the area where the obstacle event has occurred using the position information and the moving path of each of the robots requiring the moving path modification. Thereafter, the control unit 350 may modify the moving paths in the order in which the expected time is shortest, and transmit the modified moving paths to the respective robots.

Meanwhile, the control unit 350 may determine the type of obstacle using at least one of information sensed by sensors included in the robot, images taken by cameras included in the robot, and information collected by the system 300 for remotely controlling robots, and may calculate an expected resolution time of the obstacle event based on the type of obstacle. The control unit 350 may not change the path of the specific robot when the expected time for the specific robot to reach the area where the obstacle event has occurred is longer than the expected resolution time of the obstacle event.

In addition, the control unit 350 may transmit a control command that the robots stand by in a preset area until the obstacle event has been resolved to the robots without modifying the moving paths of the robots scheduled to travel through the area in which the obstacle event has occurred, when the expected resolution time of the obstacle event is less than a preset time.

Meanwhile, in the step of performing the control related to the different robot, different controls may be performed depending on the degree of urgency of the mission assigned to the different robot. Here, the different control of the different robot may include whether to maintain the inclusion of the specific area in the moving path of the different robot.

Specifically, in the step of performing the control related to the different robot, when the degree of urgency of the mission assigned to the different robot is such that it is possible to pass through the specific area, the moving path of the different robot may be controlled such that a reconnaissance of whether the obstacle event has been resolved is performed by the different robot.

In this case, a control may be performed to allow the different robot to stand by at a monitoring point from which the different robot is able to monitor the specific area. The different robot may stand by at the monitoring point until the obstacle event that occurred in the specific area is resolved. The different robot may periodically transmit information on the obstacle at the monitoring point to the system 300 for remotely controlling robots.

When the degree of urgency of the mission assigned to the different robot is such that it is impossible to pass through the specific area, a new moving path may be generated by modifying the moving path of the different robot so that the specific area is excluded from the moving path of the different robot.

As described above, the method and the system for remotely controlling robots according to the present invention enable efficient control of a plurality of robots by reflecting information on obstacles that have affected the path of a specific robot to moving paths of different robots.

Meanwhile, in the present invention, when an obstacle event has been resolved, the resolved obstacle event may be reflected to moving paths of robots to be controlled by periodically monitoring the obstacle event. Hereinafter, a method of monitoring a corresponding obstacle when an obstacle event occurs and controlling traveling of a robot when the obstacle event has been released is described.

FIGS. 8A, 8B, 8C, and 8D are conceptual views illustrating an embodiment of monitoring obstacles and resetting paths of robots according to the present invention.

Meanwhile, the control unit 350, after receiving the obstacle event, monitors the obstacle related to the obstacle event until the obstacle event is released. Specifically, the control unit 350 may determine whether the obstacle event has been resolved for the specific area using a specific robot and a different robot that detected the obstacle.

The control unit 350 may transmit a moving path including the area including the obstacle event to at least one robot of a plurality of robots.

In an embodiment, the control unit 350 may transmit a moving path with a destination of the area including the obstacle event to a robot for which a separate mission has not been assigned and thus a moving path has not been set.

In another embodiment, the system 300 for remotely controlling robots may monitor whether the obstacle event has been resolved through a different robot, by allowing the different robot to reach the specific area, without modifying the moving path of the different robot that is moving to a destination by passing through the specific area.

In another embodiment, the control unit 350 may transmit a modified moving path that includes the area including the obstacle event to a robot that is traveling to a specific destination along a preset moving path. That is, the control unit 350 may use a moving robot to monitor the obstacle by diverting the path of the moving robot.

In this case, the control unit 350 may select a robot to monitor the obstacle based on at least one of a distance between the robot and the area including the obstacle event, the importance of the mission assigned to the robot, and the position of the destination to which the robot is moving.

Meanwhile, a moving path for monitoring the obstacle may be set in two different ways.

First, the control unit 350 sets a moving path along which a robot may monitor the obstacle without passing through the area including the obstacle event. When the robot is traveling according to the moving path, the robot may approach the obstacle to an observable distance and then move to the destination. The robot may collect information on the obstacle using at least one of sensors and cameras included in the robot.

In this case, the robot may determine whether the obstacle event is released using the collected information, or transmit the collected information to the system 300 for remotely controlling robots so that the system 300 for remotely controlling robots may determine whether the obstacle event is released.

Second, the control unit 350 sets a moving path along which a robot may monitor the obstacle while passing through the area including the obstacle event. When the robot is traveling according to the moving path, the robot may move to the destination after passing through the area including the obstacle event.

In this case, when the robot passes through the area including the obstacle event, or passes through the area including the obstacle event within a preset time, the robot may determine that the obstacle event has been released, and transmit whether the obstacle event has been released to the system 300 for remotely controlling robots.

Meanwhile, when the robot passes through the area including the obstacle event, or passes through the area including the obstacle event within a preset time, the control unit 350 may track the position of the robot at a certain time interval to determine that the obstacle event has been released, even if the control unit 350 does not receive whether the obstacle event has been released from the robot.

Figure 8A:
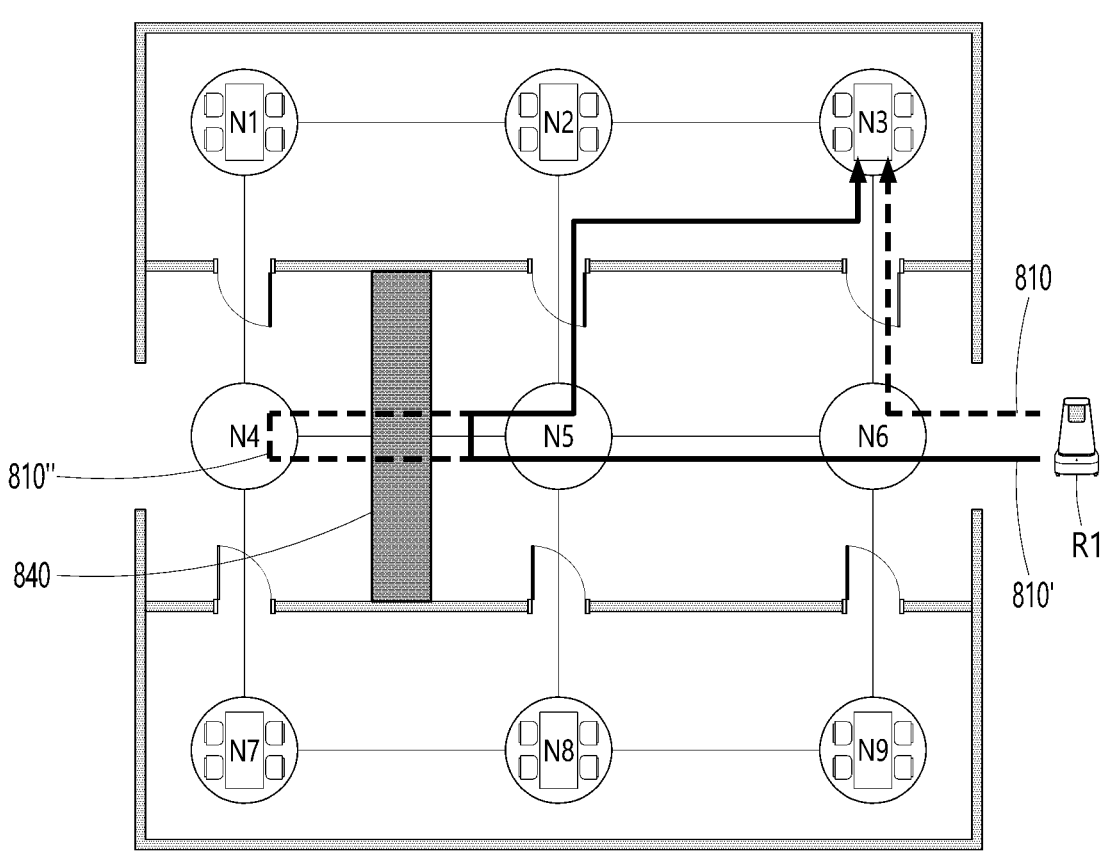
FIGS. 8A, 8B, 8C, and 8D are conceptual views illustrating an embodiment of monitoring obstacles and resetting paths of robots according to the present invention.

In an embodiment, with reference to FIG. 8A, the control unit 350 transmits a modified moving path to the robot R1 that passes through N6 and moves to N3. The modified moving path may be a path 810′ along which the robot passes through N6, N5, and N2 sequentially to reach an initial destination N3 without passing through an area 840 including the obstacle event.

In contrast, the modified moving path may be a path 810″ along which the robot travels from N5 to N4 through the area 840 including the obstacle event, and then sequentially passes through N5 and N2 to reach the initial destination N3.

The control unit 350 may set a path for monitoring different obstacles depending on the types of areas of interest. For example, when monitoring an area that is set as a non-drivable area, the control unit 350 may set a moving path in which a robot may monitor the obstacle without passing through the area including the obstacle event. In contrast, when monitoring an area set as a congestion area or an obstructed travel area, the control unit 350 may set a moving path in which a robot passes through the area including the obstacle event.

Meanwhile, the control unit 350 may receive whether the obstacle event has been released from the robot that monitored the area including the obstacle event, or may determine whether the obstacle event has been released using information collected from at least one of the sensors and cameras included in the robot that monitored the area including the obstacle event.

The control unit 350 may transmit the modified moving path to at least one of the robots to be controlled when it is determined that the obstacle event has been released. Specifically, the control unit 350 may update the pre-stored map information when it is determined that the obstacle event has been released. Accordingly, the area of interest may be released from the pre-stored map information.

When the area of interest is released from the pre-stored map information, the control unit 350 may transmit the modified moving path to at least one of the robots to be controlled.

Specifically, the control unit 350 may recalculate the shortest path of each of the robots for which moving paths are set when it is determined that the obstacle event has been released.

When it takes shorter time to move along a new moving path through the area where the obstacle event has been released than the existing moving path, the control unit 350 may transmit the new moving path to the robot.

Figure 8B:
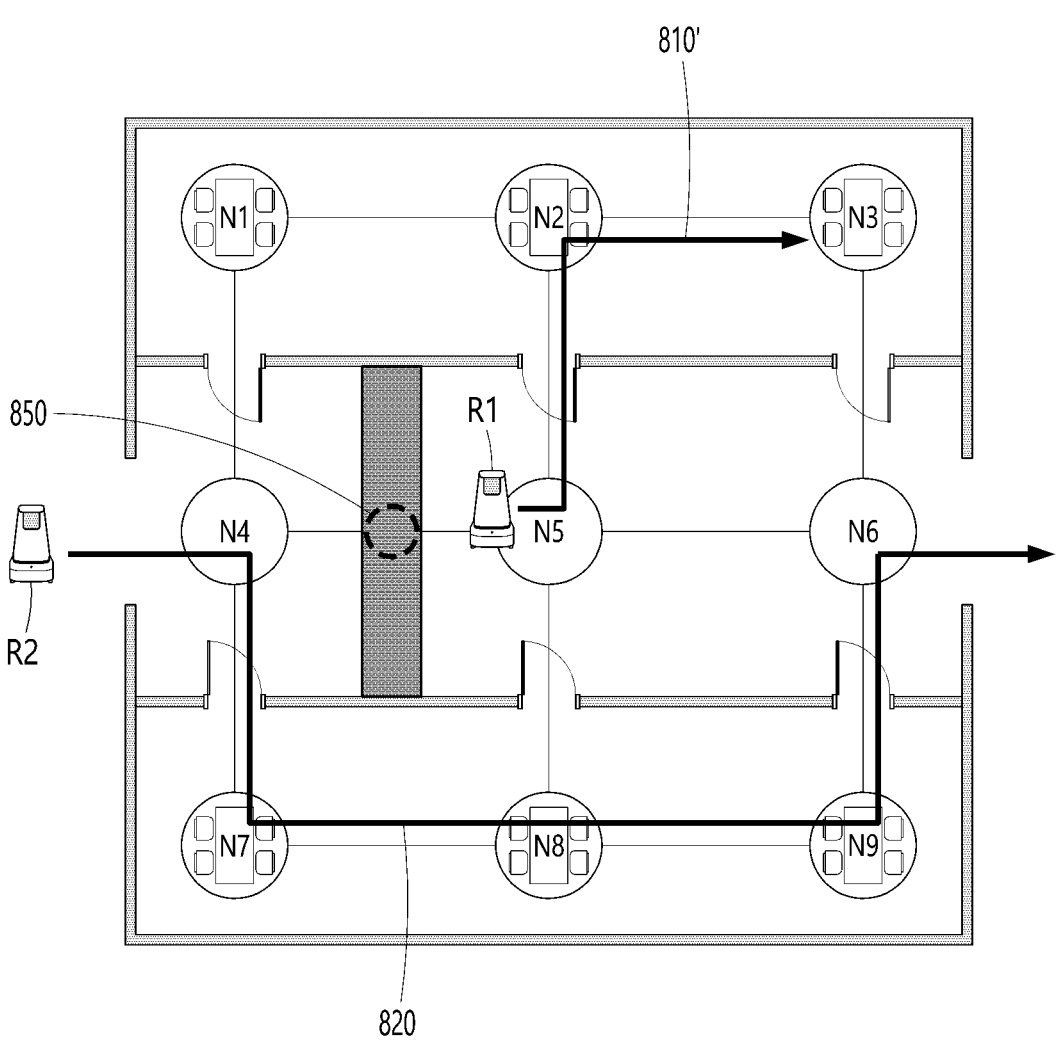

In an embodiment, with reference to FIG. 8B, the second robot R2 may not pass through the area including the obstacle event, but passes through N4, N7, N8, and N9 sequentially and travels along a moving path 820 with N6 as a destination.

When the second robot R2 detects that the obstacle in the area including the obstacle event has been resolved while traveling along the moving path 820, the control unit 350 may release the area where the obstacle event has been resolved from the area of interest.

Figure 8C:
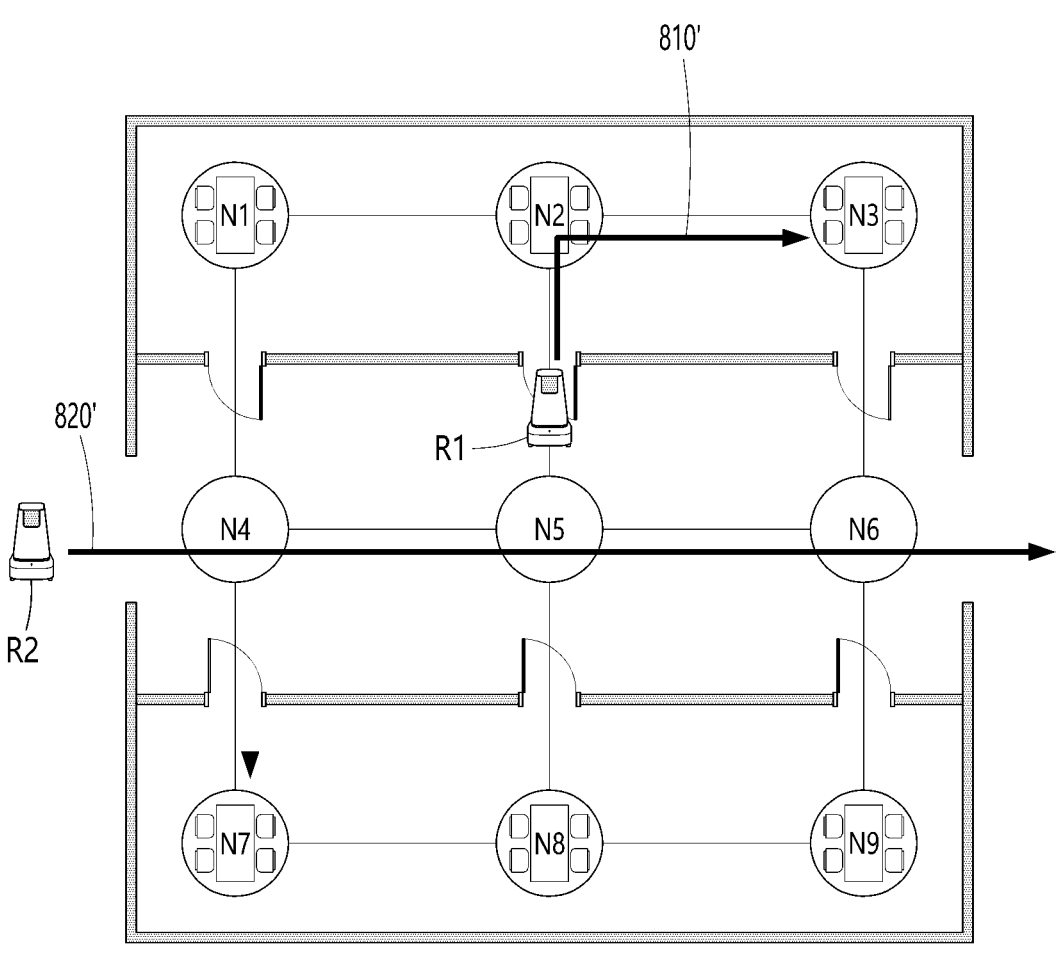

With reference to FIG. 8C, the control unit 350 may transmit to the second robot R2 a new moving path 820' along which a robot sequentially passes through N4 and N5, with N6 as a destination. Since the new moving path 820' is a shorter path for the robot to travel than the existing moving path 820, the control unit 350 may allow the second robot R2 to travel along the new moving path 820'.

Meanwhile, the control unit 350 may calculate an expected resolution time of the obstacle based on information received from a specific robot. Specifically, the control unit 350 may calculate an expected resolution time of the obstacle when the obstacle event has not been resolved based on information received from a specific robot, but the obstacle event is predicted to be resolved within a certain period of time.

In this case, the control unit 350 matches and stores the expected resolution time of the obstacle to information on the area including the obstacle event included in the map information. Thereafter, in setting a moving path of the specific robot, the control unit 350 may transmit to the specific robot a moving path passing through the area including the obstacle event when the specific robot is expected to reach the area including the obstacle event after the expected resolution time of the obstacle event.

Figure 8D:
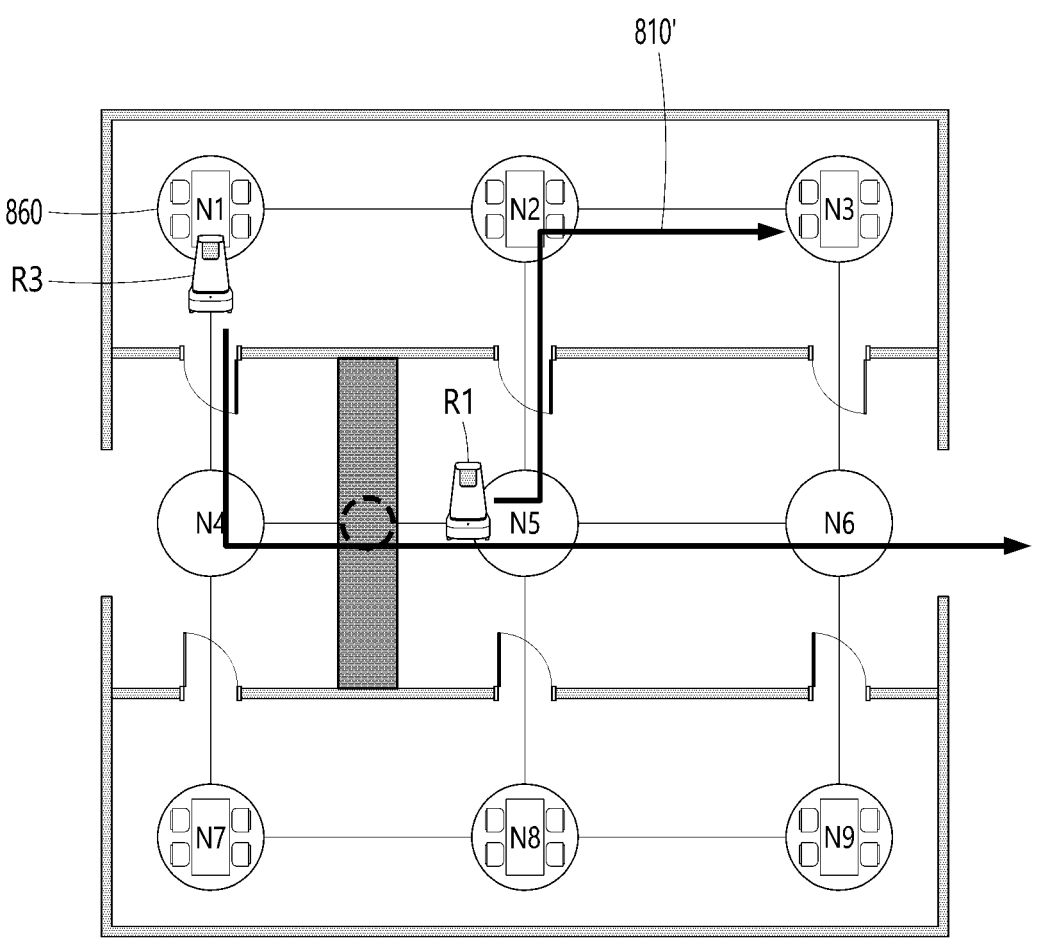

In an embodiment, with reference to FIG. 8D, the control unit 350 calculates an expected resolution time of the obstacle based on information received from the first robot R1. Thereafter, when a third robot R3 positioned at a specific position 860 is to be moved to N6, the control unit 350 may calculate an expected time for the third robot R3 to move from the specific position 860 to the area including the obstacle event.

When the expected time of moving is greater than the expected resolution time of the obstacle, the control unit 350 may transmit to the third robot R3 a moving path along which the third robot R3 passes through the area including the obstacle event (sequentially passing through N4 and N5) to reach N6.

Meanwhile, when it is determined that the obstacle event has not been released, the control unit 350 may monitor the obstacle again using a different robot after a certain period of time.

In the present invention, it is possible to monitor obstacles at time intervals.

The time interval may vary depending on at least one of the types of obstacle events, the number of obstacle reconnaissance, and the types of areas in which the obstacle events occurred.

In an embodiment, the time interval for monitoring whether an obstacle event has been resolved may be calculated based on the types of obstacle events. Specifically, the storage unit 320 may store a list of types of obstacle events, in which an expected resolution time for each type of obstacle event is matched and stored in the list.

The control unit 350, based on the type of the obstacle event, searches for an expected resolution time corresponding to the type of the obstacle event in pre-stored obstacle event information, and determines the monitoring time to be first performed after the obstacle event has occurred based on the result of the search. The control unit 350 may transmit a moving path including the area in which an obstacle event has occurred to at least one robot, such that the at least one robot passes through the area in which the obstacle event has occurred after the searched time from the time the obstacle event is received has elapsed.

After an initial monitoring is performed, the time interval between additionally performed monitoring may vary. Specifically, the control unit 350 may increase the time interval as the number of times the control unit 350 detects that the obstacle event has not been released increases. That is, the control unit 350 may increase the time interval as the number of times the robot moves to the area where the obstacle event occurred increases.

For example, the control unit 350 may double the next monitoring interval whenever the control unit 350 detects that an obstacle event has not been released.

When the monitoring interval increases excessively such that further monitoring is meaningless, the control unit 350 may stop monitoring a specific area.

In an embodiment, the control unit 350 may change the type of the area in which the obstacle event occurred based on the number of times the control unit 350 monitors whether the obstacle event has been resolved. Specifically, based on receiving an obstacle event for the specific area, the specific area is set as a first type of obstacle area, and when, as a result of determining whether the obstacle event has been resolved, the obstacle event is not resolved at least a preset number of times, the specific area is set as a second type of obstacle area different from the first type of obstacle area.

When the specific area is set as the first type of obstacle area, the control unit 350 periodically monitors the first type of obstacle area to determine whether the obstacle event has been resolved. As a result of monitoring, when the obstacle event in the specific area is resolved, a new moving path including the specific area may be generated.

In contrast, when the specific area is set as the second type of obstacle area, the control unit 350 does not perform monitoring of the second type of obstacle area. That is, the second type of obstacle area is considered to be permanently unavailable for the robot to move, and a new moving path including the specific area may not be generated.

Therefore, in the present invention, the number of times of monitoring for an obstacle that is unlikely to be removed may be decreased.

In the present invention, the time interval and number of times an obstacle is monitored may be changed to fit a situation in a space, thereby enabling monitoring of whether an obstacle event has been resolved with optimal efficiency.

Further, in the present invention, the detected obstacle is continuously monitored so that the corresponding area can be used as a traveling path of a robot when the obstacle event is released. Therefore, in the present invention, the traveling of a plurality of robots can be efficiently controlled according to situations of obstacles in a space.

Meanwhile, in the present invention, when a modified path considering obstacles is not possible to be set, a mission of a robot can be performed by using a different controllable robot.

Figure 9A:
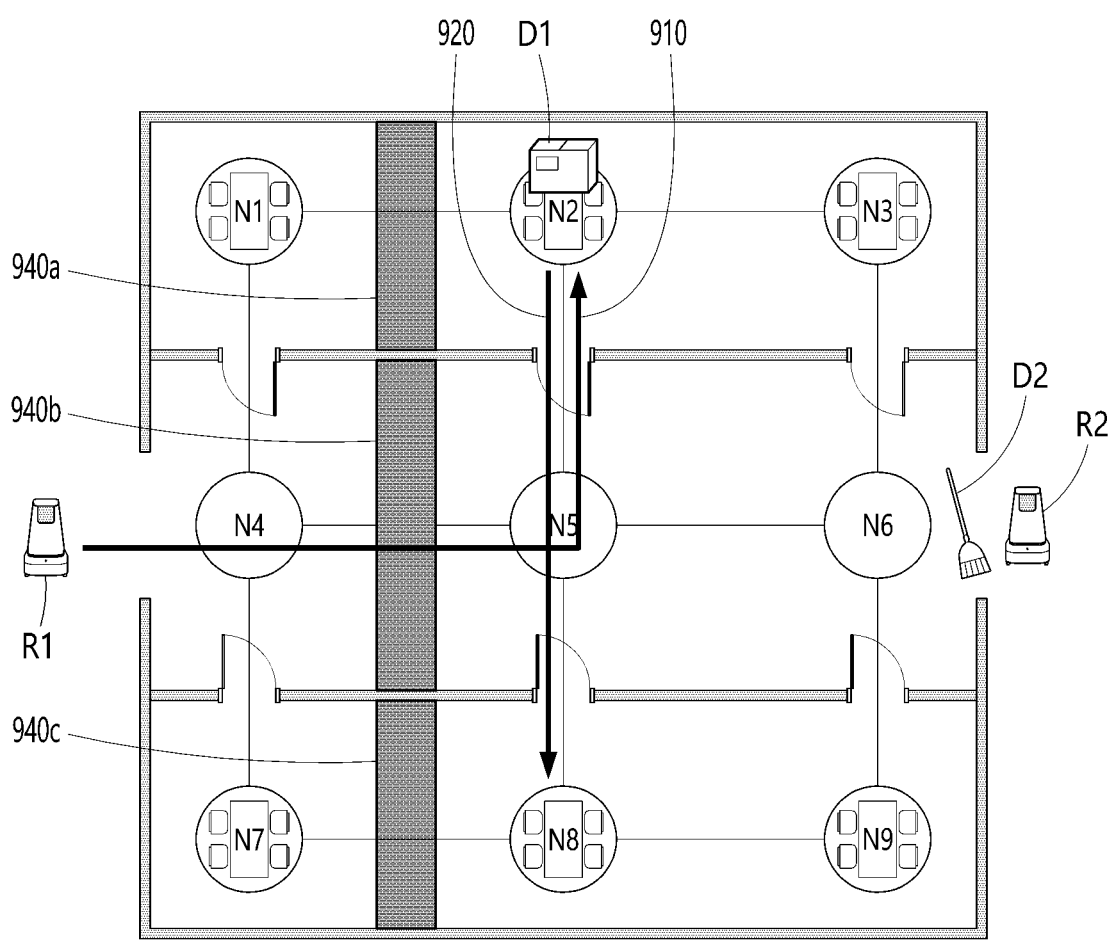
FIGS. 9A and 9B are conceptual views illustrating an embodiment in which a different robot performs a mission for a robot that is unable to perform the mission due to obstacles.
Figure 9B:
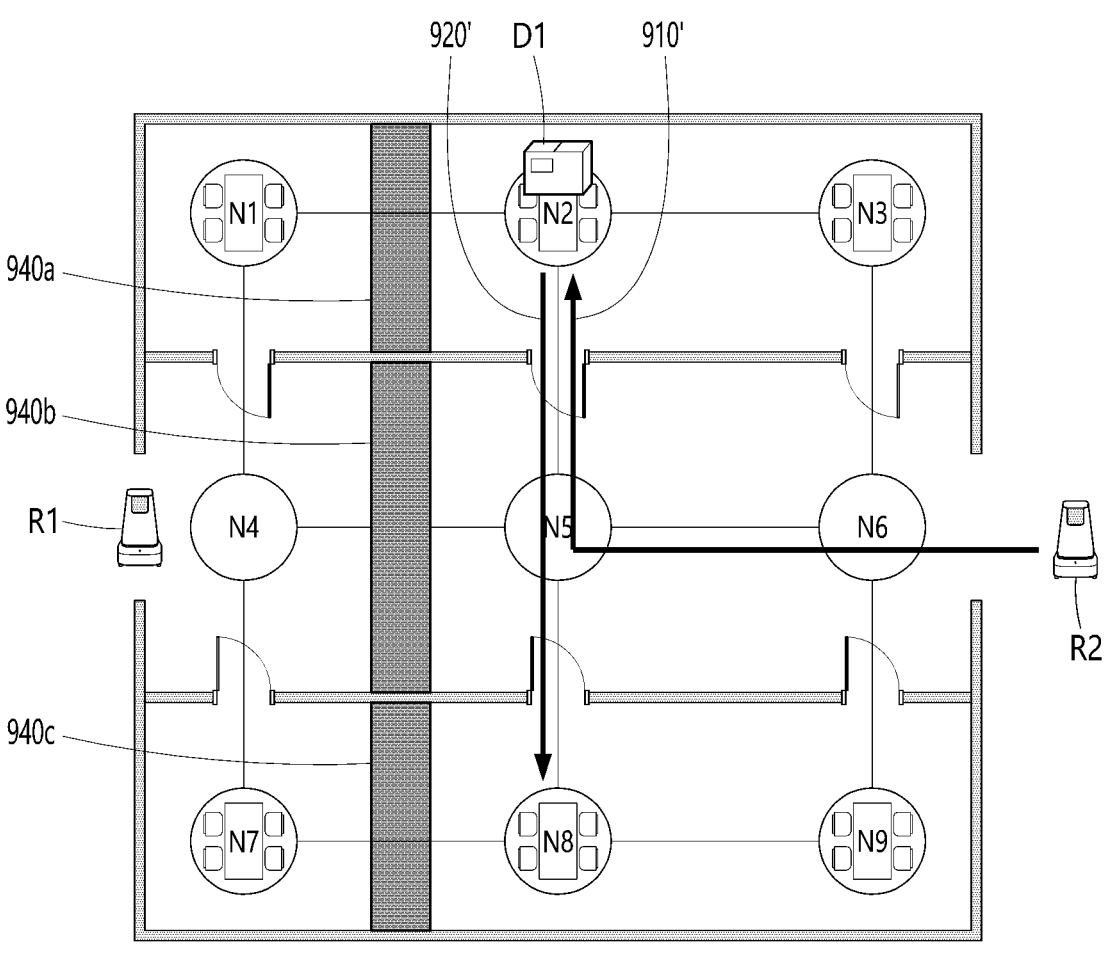
Figure 10:
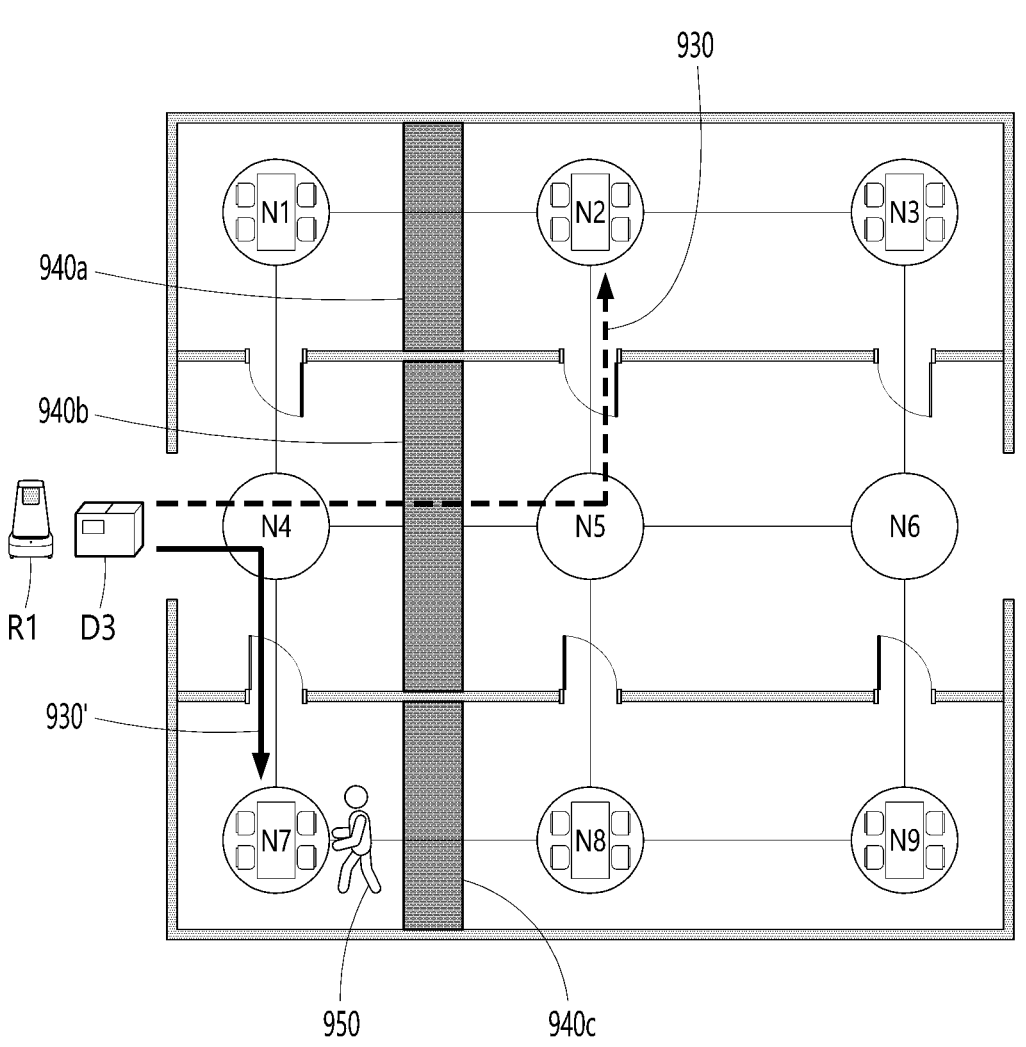
FIG. 10 is a conceptual view illustrating an embodiment in which an administrator intervenes with a robot that is unable to perform a mission due to obstacles.

FIGS. 9A and 9B are conceptual views illustrating an embodiment in which a different robot performs a mission for a robot that is unable to perform the mission due to obstacles, and FIG. 10 is a conceptual view illustrating an embodiment in which an administrator intervenes with a robot that is unable to perform a mission due to obstacles.

When the control unit 350 is unable to generate a modified moving path considering an obstacle event, the control unit 350 may transmit a control command to cancel traveling on an initial moving path to the specific robot, and transmit a moving path including a destination included in the initial moving path to a robot different from the specific robot.

The control unit 350 may select a robot for reassigning the mission of the specific robot based on at least one of the type of mission assigned to each of the robots to be controlled, the importance of the mission, the distance to the destination included in the initial moving path, and the moving paths set for the robots.

In an embodiment, with reference to FIG. 9A, the first robot R1 performs a mission D1 to move to N2, receive a package, and transport the package to N8. When the first robot R1 is unable to perform the mission D1 due to three areas 940a to 940b including obstacle events, the control unit 350 searches for robots that are able to move to N2 and N8, and transmits a new moving path to the second robot R2 that performs a less important cleaning mission D2 among the searched robots.

With reference to FIG. 9B, the mission assigned to the first robot R1 is canceled, and the second robot may move to N2, receive the package, and perform the mission D1 of transporting the package to N8.

Meanwhile, the control unit 350 enables an administrator to intervene in the mission of the robot when the control unit 350 is unable to generate a modified moving path considering the obstacle event. Specifically, when the control unit

350 is unable to generate a modified moving path considering the obstacle event, the control unit 350 may transmit to the specific robot a modified moving path including a destination different from the destination included in the initial moving path of the specific robot.

Here, the different destination means a position in which the administrator is able to intervene, and when the destination of the robot is changed, the control unit 350 may output the changed destination together with a map to allow the administrator to move to the changed destination.

In an embodiment, with reference to FIG. 10, the first robot R1 travels along a predetermined moving path 930 to perform a mission D3 of transporting a package to N2. Due to the three areas (940a to 940c) including the obstacle events, the first robot R1 is unable to perform the mission D3, and since the package is being transported by the first robot R1, the mission cannot be reassigned to a different robot. In this case, the control unit 350 may set a point to which the first robot R1 is able to move as a new destination N7, and transmit a moving path 930' for moving to the new destination N7 to the first robot R1 so that the package can be received by the administrator.

In addition, the control unit 350 outputs the new destination N7 to display unit 330 so that the administrator 950 may move to the new destination N7 to receive the package from the first robot R1.

As described above, in the present invention, when a detour path of a robot cannot be generated due to obstacles, it is possible to allow the robot to perform a mission even in an unexpected situation due to obstacles by using a different robot or allowing the intervention of an administrator.

As described above, a method and a system for remotely controlling robots according to the present invention can provide a robot control environment that can flexibly respond to obstacles by reflecting information on obstacles affecting movement of the robot to a corresponding robot as well as to moving paths of different robots.

Further, a method and a system for remotely controlling robots according to the present invention use robots to monitor whether an obstacle event has been resolved, thereby enabling efficient remote management of obstacles without an administrator's intervention.

In addition, a method and a system for remotely controlling robots according to the present invention continuously monitor whether an obstacle event is released (or resolved) so that, when the obstacle event is released, the corresponding area can be used as a traveling path for a robot. Therefore, in the present invention, the traveling of a plurality of robots can be efficiently controlled according to situations of obstacles in a space.

Furthermore, in the present invention, when a detour path of a robot cannot be generated due to obstacles, it is possible to allow a mission assigned to the robot to be completed even in an unexpected situation due to obstacles by using a different robot or allowing the intervention of an administrator.

Meanwhile, the present invention described above may be executed by one or more processes on a computer and implemented as a program that can be stored on a computer-readable medium.

Further, the present invention described above may be implemented as computer-readable code or instructions on a medium in which a program is recorded. That is, the present invention may be provided in the form of a program.

Meanwhile, the computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices.

Further, the computer-readable medium may be a server or cloud storage that includes storage and that the electronic device is accessible through communication. In this case, the computer may download the program according to the present invention from the server or cloud storage, through wired or wireless communication.

Further, in the present invention, the computer described above is an electronic device equipped with a processor, that is, a central processing unit (CPU), and is not particularly limited to any type.

Meanwhile, it should be appreciated that the detailed description is interpreted as being illustrative in every sense, not restrictive. The scope of the present invention should be determined based on the reasonable interpretation of the appended claims, and all of the modifications within the equivalent scope of the present invention belong to the scope of the present invention.

What is claimed is:

1. A method of remotely controlling robots by a control unit, comprising:
controlling a specific robot to move along a first path that is preset;
receiving an obstacle event at a specific area of the first path that prevents the specific robot from moving along the first path;
generating a second path for avoiding the specific area based on the obstacle event, a destination of the second path being related to a destination of the first path;
controlling the specific robot to allow the specific robot to move along the second path;
setting, by the control unit, a moving path of another robot, selected by the control unit, to the specific area and controlling the another robot to move to and monitor the obstacle event determine whether the obstacle event has been resolved:
receiving, by the control unit, information transmitted from the another robot as to whether the obstacle event has been resolved; and
transmitting, by the control unit, a modified moving path to at least one of the robots when it is determined that the obstacle event has been resolved.

2. The method of claim 1, wherein in the generating of the second path, at least a portion of the first path is modified so that the specific area is excluded from the first path.

3. The method of claim 2, wherein the generating of the second path comprises:
determining whether an avoidance path exists that avoids the specific area and reaches the destination of the first path;
generating the second path in a case where the avoidance path exists as a result of the determination; and
performing a different control related to a mission assigned to the specific robot, depending on a mission characteristic of the mission assigned to the specific robot, in a case where the avoidance path does not exist as a result of the determination.

4. The method of claim 3, wherein the different control comprises:
a first control configured to assign the mission assigned to the specific robot to a different robot in a case where the mission assigned to the specific robot has a character-istic of a first mission that is transferable to a robot different from the specific robot; and a second control configured to move the specific robot to the specific area in a case where the mission assigned to the specific robot has a characteristic of a second mission that is not transferable to a robot different from the specific robot.

5. The method of claim 4, further comprising:
generating a moving path of the different robot, such that the mission assigned to the specific robot is performed by the different robot,
wherein a destination corresponding to the moving path of the different robot corresponds to the destination of the first path.

6. The method of claim 5, wherein the moving path set for the specific robot is canceled in a case where the mission assigned to the specific robot is assigned to the different robot.

7. The method of claim 1, further comprising:
searching for whether there is a different robot having a moving path that includes the specific area related to the obstacle event; and
performing control related to the different robot, in a case where the different robot exists as a result of the search.

8. The method of claim 7, wherein in the performing of the control related to the different robot, a different control is performed depending on the degree of urgency of a mission assigned to the different robot.

9. The method of claim 8, wherein the different control of the different robot includes whether to maintain the inclusion of the specific area in the moving path of the different robot.

10. The method of claim 9, wherein in the performing of the control related to the different robot,
a new moving path is generated by modifying the moving path of the different robot so that the specific area is excluded from the moving path of the different robot, in a case where the degree of urgency of the mission assigned to the different robot is such that it is impos-sible to pass through the specific area.

11. The method of claim 1, further comprising:
setting the specific area as a first type of obstacle area based on receiving the obstacle event for the specific area,
wherein the specific area is set as a second type of obstacle area different from the first type of obstacle area in a case where the obstacle event is not resolved at least a preset number of times as a result of the determining of whether the obstacle event has been resolved.

12. The method of claim 11, wherein a new moving path including the specific area is able to be generated in a case where the specific area is set as the first type of obstacle area, and a new moving path including the specific area is not generated in a case where the specific area is set as the second type of obstacle area.

13. The method of claim 2, further comprising:
setting a type of the obstacle event, in a case of receiving the obstacle event, based on at least one of information sensed from the specific robot, image information taken from the specific robot, movement information on the specific robot, and image information taken from a camera disposed within a predetermined distance from the specific robot.

14. The method of claim 13, further comprising:
searching for, based on the type of the obstacle event, an expected resolution time corresponding to the type of the obstacle event in pre-stored obstacle event infor-mation;

calculating, based on a time point at which the obstacle event is received and the expected resolution time that is searched for, a time at which it is first determined that the obstacle event has been resolved after the obstacle event occurred; and transmitting a moving path including the area in which the obstacle event occurred to at least one robot, such that the at least one robot moves to the area in which the obstacle event occurred at the calculated time.

15. A system for remotely controlling traveling of robots, comprising:

a communication unit configured to transmit and receive data; and a control unit configured to control a specific robot to move along a first path that is preset, wherein the control unit, in case of receiving an obstacle event at a specific area of the first path, generates a second path for avoiding the specific area based on the obstacle event, a destination of the second path being related to a destination of the first path, controls the specific robot to allow the specific robot to move along the second path, sets a moving path of another robot, selected by the control unit, to the specific area, and controls the another robot to move to and monitor the obstacle event to determine whether the obstacle event has been resolved receives information transmitted from the another robot as to whether the obstacle event has been resolved, and transmits a modified moving path to at least one of the robots when it is determined that the obstacle event has been resolved.

16. A non-transitory computer-readable recording medium storing a program for remotely controlling robots, the program, when executed by a processor of a control unit, causing the processor to perform the steps comprising:

controlling a specific robot to move along a first path that is preset;

receiving an obstacle event at a specific area of the first path;

generating a second path avoiding the specific area based on the obstacle event, a destination of the second path being related to a destination of the first path;

controlling the specific robot to allow the specific robot to move along the second path; and setting, by the processor of the control unit, a moving path of another robot, selected by the processor of the control unit, to the specific area and controlling the another robot to move to and monitor the obstacle event to determine whether the obstacle event has been resolved;

receiving, by the control unit, information transmitted from the another robot as to whether the obstacle event has been resolved; and transmitting, by the control unit, a modified moving path to at least one of the robots when it is determined that the obstacle event has been resolved.

17. A building in which a robot that flexibly responds to obstacles travels, the building comprises:

an indoor area in which the robot is traveling; and cameras disposed in the building and configured to photograph the indoor area, wherein the robot is controlled to travel through the indoor area based on control commands received from a cloud server, and wherein the cloud server, in a case where the robot is traveling along a first path that is preset, and an obstacle event occurs at a specific area included in the first path in the indoor area, generates a second path avoiding the specific area using image information taken through the cameras, performs control of the robot to allow the robot to travel along the second path, sets a moving path of another robot, selected by the cloud server, to the specific area, controls the another robot to move to and monitor the obstacle event to determine whether the obstacle event has been resolved, receives information transmitted from the another robot as to whether the obstacle event has been resolved, and transmits a modified moving path to at least one of the robots to be controlled when it is determined that the obstacle event has been resolved.

18. The building of claim 17, wherein a destination of the second path is related to a destination of the first path, and wherein the second path is a path in which at least a portion of the first path is modified such that the specific area is excluded from the first path.

19. The building of claim 18, wherein the cloud server determines whether an avoidance path exists that avoids the specific area and reaches a destination of the first path, generates the second path in a case where the avoidance path exists as a result of the determination, and performs a different control related to a mission assigned to the robot, according to a mission characteristic of the mission assigned to the robot, in a case where the avoidance path does not exist, as a result of the determination.

20. The method of claim 1, wherein the modified moving path includes the specific area.

* * * * *